(12) United States Patent
Tan et al.

(10) Patent No.: US 11,394,608 B2
(45) Date of Patent: Jul. 19, 2022

(54) SPEAKER INTERACTION METHOD, SPEAKER, AND SPEAKER SYSTEM

(71) Applicant: HUAWEI TECHNOLOGIES CO., LTD., Shenzhen (CN)

(72) Inventors: Tan Tan, Shenzhen (CN); Peng Zhao, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/275,262

(22) PCT Filed: Sep. 2, 2019

(86) PCT No.: PCT/CN2019/103909
§ 371 (c)(1),
(2) Date: Mar. 11, 2021

(87) PCT Pub. No.: WO2020/063261
PCT Pub. Date: Apr. 2, 2020

(65) Prior Publication Data
US 2022/0052913 A1 Feb. 17, 2022

(30) Foreign Application Priority Data
Sep. 28, 2018 (CN) .......................... 201811137613.4

(51) Int. Cl.
*H04L 12/24* (2006.01)
*H04L 15/22* (2006.01)
(Continued)

(52) U.S. Cl.
CPC .......... *H04L 41/0806* (2013.01); *G10L 15/22* (2013.01); *H04L 41/12* (2013.01); *H04L 67/10* (2013.01)

(58) Field of Classification Search
CPC . H04L 41/0806; H04L 41/0803; H04L 41/08; H04L 41/12; H04L 67/10; G10L 15/22
(Continued)

(56) References Cited

U.S. PATENT DOCUMENTS

2007/0050621 A1 3/2007 Young et al.
2016/0014631 A1* 1/2016 Wang .................. H04W 68/005
455/41.2
(Continued)

FOREIGN PATENT DOCUMENTS

CN 101266637 A * 9/2008
CN 105072534 A 11/2015
(Continued)

*Primary Examiner* — Ruolei Zong
(74) *Attorney, Agent, or Firm* — Maier & Maier, PLLC

(57) ABSTRACT

A method includes: receiving, by a mother speaker, a first data packet sent by a child speaker; parsing the first data packet to obtain the identifier of the child speaker; when determining, based on the identifier of the child speaker, that the child speaker meets permission, sending, to a cloud server, a third data packet that carries an identifier of the mother speaker, the identifier of the child speaker and voice data; receiving a fourth data packet that is sent by the cloud server and that carries the identifier of the mother speaker, the identifier of the child speaker, and reply data responding to the voice data; and parsing the fourth data packet to send a second data packet that carries the identifier of the child speaker and the reply data responding to the voice data to the child speaker.

20 Claims, 12 Drawing Sheets

(51) Int. Cl.
*H04L 41/0806* (2022.01)
*G10L 15/22* (2006.01)
*H04L 41/12* (2022.01)
*H04L 67/10* (2022.01)

(58) Field of Classification Search
USPC .......................................................... 709/223
See application file for complete search history.

(56) References Cited

U.S. PATENT DOCUMENTS

| | | | |
|---|---|---|---|
| 2016/0277182 A1* | 9/2016 | Suzuki | H04L 9/3226 |
| 2018/0242157 A1* | 8/2018 | Yamamoto | H04W 12/069 |
| 2018/0255436 A1* | 9/2018 | Lou | H04W 4/08 |
| 2019/0288657 A1* | 9/2019 | Arunachalam | H03G 5/165 |

FOREIGN PATENT DOCUMENTS

| | | | | |
|---|---|---|---|---|
| CN | 105307143 A | 2/2016 | | |
| CN | 105451129 A | 3/2016 | | |
| CN | 106357769 A | 1/2017 | | |
| CN | 106358157 A | 1/2017 | | |
| CN | 106506292 A | 3/2017 | | |
| CN | 106550304 A | 3/2017 | | |
| CN | 106792695 A | 5/2017 | | |
| CN | 106973363 A | 7/2017 | | |
| CN | 107145327 A | 9/2017 | | |
| CN | 107767867 A | 3/2018 | | |
| CN | 107770047 A | 3/2018 | | |
| CN | 108366004 A | 8/2018 | | |
| CN | 108574515 A | 9/2018 | | |
| WO | WO-2017056406 A1 * | 4/2017 | | H04L 9/32 |
| WO | 2017203405 A1 | 11/2017 | | |
| WO | WO-2018112942 A1 * | 6/2018 | | G06F 21/445 |
| WO | WO-2018233041 A1 * | 12/2018 | | H04L 9/0866 |

* cited by examiner

SPEAKER INTERACTION METHOD, SPEAKER, AND SPEAKER SYSTEM

CROSS-REFERENCE TO RELATED APPLICATIONS

This application is a National Stage of International Application No. PCT/CN2019/103909, filed on Sep. 2, 2019, which claims priority to Chinese Patent Application No. 201811137613.4, filed on Sep. 28, 2018. Both of the aforementioned applications are hereby incorporated by reference in their entireties.

TECHNICAL FIELD

Embodiments relate to the field of smart appliances, and in particular, to a speaker interaction method, a speaker, and a speaker system.

BACKGROUND

A home smart device has become an important field for development of a future artificial intelligence (AI) technology, and a smart speaker is a typical application in this field.

In a general application scenario, an independent speaker is used as a center for performing voice interaction and control with a user, and can cover only a specific range, for example, in a home scenario, may cover only a range of one room. A single speaker cannot cover an entire range of a home. Especially in a multi-room scenario, the single speaker can be located only in one room, and therefore only interaction with a user in a room in which the speaker is located can be implemented. For a user in another room, speaker wakeup interaction experience is poor. By installing independent speakers in different rooms, home coverage can be achieved, but consumption price costs of a user are high. Each speaker interacts with a cloud server independently and does not interact with each other. In addition, a same wakeup word of a plurality of speakers is likely to cause a false wakeup. Therefore, user experience is poor.

SUMMARY

Embodiments provide a speaker interaction method, a speaker, and a speaker system, to implement interaction between speakers, thereby implementing linkage between the speakers.

According to a first aspect, a speaker interaction method is provided. The speaker interaction method is applied to a mother speaker in a speaker system. The speaker system includes one mother speaker and at least one child speaker. A speaker interaction method is provided in this embodiment. The mother speaker receives a first data packet sent by the child speaker, where the first data packet includes an identifier of the child speaker and voice data, and the voice data is data of a voice input by a user. The mother speaker parses the first data packet to obtain the identifier of the child speaker. The mother speaker sends a third data packet to a cloud server when determining, based on the identifier of the child speaker, that the child speaker meets permission, where the third data packet carries an identifier of the mother speaker, the identifier of the child speaker, and the voice data. The mother speaker receives a fourth data packet sent by the cloud server, where the fourth data packet carries the identifier of the mother speaker, the identifier of the child speaker, and reply data responding to the voice data. The mother speaker parses the fourth data packet to obtain a second data packet, and sends the second data packet to the child speaker, where the second data packet carries the identifier of the child speaker and the reply data responding to the voice data. Because the mother speaker can receive the voice data of the child speaker, when the child speaker meets the permission, the mother speaker transmits the voice data of the child speaker to the cloud server, then receives the reply data that is sent by the cloud server and that responds to the voice data, and feeds back the reply data to the child speaker, to implement interaction between speakers, thereby implementing linkage between the speakers.

To determine the permission of the child speaker by the mother speaker, in an example solution, a solution for controlling the permission of the child speaker is provided. The mother speaker obtains a permission setting instruction sent by a user terminal, where the permission setting instruction is used to set the following permission of the child speaker: whether the child speaker is available. The mother speaker sets permission of the child speaker according to the permission setting instruction. The permission further includes a period of time during which the child speaker is available, or a period of time during which the child speaker is unavailable.

To implement interaction between the mother speaker and more child speakers, a manner of adding a new child speaker is further provided. In an example solution, before the mother speaker receives a first data packet sent by the child speaker, the mother speaker obtains a child speaker addition instruction sent by a user terminal, where the child speaker addition instruction includes the identifier of the mother speaker; the mother speaker sends s a multicast sniffing packet according to the child speaker addition instruction; the mother speaker receives a search result packet of the child speaker responding to the multicast sniffing packet; the mother speaker allocates the identifier of the child speaker to the child speaker based on the search result packet, and establishes a connection to the child speaker; and the mother speaker feeds back an addition success instruction to the user terminal, where the addition success instruction includes the identifier of the mother speaker and the identifier of the child speaker.

In an example solution, for a newly-added child speaker, the child speaker may be initially configured, and before the mother speaker feeds back an addition success instruction to the user terminal, the mother speaker sends, configuration information to the child speaker, where the configuration information includes information about the identifier, initial volume, and alarm setting of the child speaker; and the mother speaker receives a first synchronization success message sent by the child speaker responding the configuration information.

In an example solution, for a newly-added child speaker, permission of the child speaker may be initially configured, that the mother speaker receives a first synchronization success message sent by the child speaker responding the configuration information further includes: the mother speaker sets permission of the child speaker.

In addition, the user can actively enable synchronization of a specific child speaker, so that all configurations of the child speaker are consistent with those of an associated mother speaker. In an example solution, the mother speaker obtains a synchronous configuration enabling instruction sent by a user terminal, where the synchronous enabling instruction includes the identifier of the mother speaker and the identifier of the child speaker. The mother speaker sends current configuration information of the mother speaker to the child speaker according to the synchronous configuration enabling instruction, where the current configuration information includes the identifier of the child speaker and a value of at least one configuration item, and the at least one configuration item includes one or more of the following: volume setting and alarm setting. The mother speaker receives a second synchronization success message sent by the child speaker responding to the current configuration information. The mother speaker sends a third synchronization success message to the user terminal based on the second synchronization success message.

When all the configurations of the child speaker are consistent with those of the associated mother speaker, if the configuration of the mother speaker is modified, the configuration of the child speaker is modified synchronously. In an example solution, after that the mother speaker sends a third synchronization success message to the user terminal based on the second synchronization success message, the mother speaker obtains a mother speaker configuration instruction sent by the user terminal, where the mother speaker configuration instruction includes the identifier of the mother speaker and a value of at least one configuration item, and the at least one configuration item includes one or more of the following: volume setting and alarm setting; the mother speaker configures the mother speaker according to the mother speaker configuration instruction; the mother speaker generates a child speaker configuration instruction according to the mother speaker configuration instruction, where the child speaker configuration instruction includes the identifier of the child speaker and a value of at least one configuration item, and the at least one configuration item includes one or more of the following: volume setting and alarm setting; the mother speaker sends the child speaker configuration instruction to the child speaker; the mother speaker receives a fourth synchronization success message sent by the child speaker responding to the child speaker configuration instruction; and the mother speaker sends a fifth synchronization success message to the user terminal based on the fourth synchronization success message.

According to a second aspect, a speaker is provided. The speaker is applied to a mother speaker in a speaker system, the speaker system includes one mother speaker and at least one child speaker, and the mother speaker includes a receiving unit, a processing unit, and a sending unit. Functions implemented by each unit module provided in the embodiments are as follows. The receiving unit is configured to receive a first data packet sent by a child speaker, where the first data packet includes an identifier of the child speaker and voice data, and the voice data is data of a voice input by a user. The processing unit is configured to parse the first data packet received by the receiving unit to obtain the identifier of the child speaker. The sending unit is configured to send a third data packet to a cloud server when the processing unit determines, based on the identifier of the child speaker, that the child speaker meets permission, where the third data packet carries an identifier of the mother speaker, the identifier of the child speaker, and the voice data. The receiving unit is configured to receive a fourth data packet sent by the cloud server, where the fourth data packet carries the identifier of the mother speaker, the identifier of the child speaker, and reply data responding to the voice data. The processing unit is configured to parse the fourth data packet to obtain a second data packet. The sending unit is further configured to send the second data packet obtained by the processing unit to the child speaker, where the second data packet carries the identifier of the child speaker and the reply data responding to the voice data.

In an example solution, the receiving unit is further configured to obtain a permission setting instruction sent by a user terminal, where the permission setting instruction is used to set the following permission of the child speaker: whether the child speaker is available. The processing unit is further configured to set permission of the child speaker according to the permission setting instruction obtained by the receiving unit.

In an example solution, the permission further includes a period of time during which the child speaker is available, or a period of time during which the child speaker is unavailable.

In an example solution, the receiving unit is further configured to obtain a child speaker addition instruction sent by a user terminal, where the child speaker addition instruction includes the identifier of the mother speaker. The sending unit is further configured to send a multicast sniffing packet according to the child speaker addition instruction obtained by the receiving unit. The receiving unit is further configured to receive a search result packet of the child speaker responding to the multicast sniffing packet. The processing unit is configured to allocate the identifier of the child speaker to the child speaker based on the search result packet and establish a connection to the child speaker. The sending unit is further configured to feed back a first addition success instruction to the user terminal, where the first addition success instruction includes the identifier of the mother speaker and the identifier of the child speaker.

In an example solution, the sending unit is further configured to send configuration information to the child speaker, where the configuration information includes information about the identifier, initial volume, and alarm setting of the child speaker. The receiving unit is further configured to receive a first synchronization success message sent by the child speaker responding to the configuration information.

In an example solution, the processing unit is further configured to set permission of the child speaker.

In an example solution, the receiving unit is configured to obtain a synchronous configuration enabling instruction sent by a user terminal, where the synchronous enabling instruction includes the identifier of the mother speaker and the identifier of the child speaker. The sending unit is configured to send current configuration information of the mother speaker to the child speaker according to the synchronous configuration enabling instruction received by the receiving unit, where the current configuration information includes the identifier of the child speaker and a value of at least one configuration item, and the at least one configuration item includes one or more of the following: volume setting and alarm setting. The receiving unit is configured to receive a second synchronization success message sent by the child speaker responding to the current configuration information. The sending unit is configured to send a third synchronization success message to the user terminal based on the second synchronization success message received by the receiving unit.

In an example solution, the receiving unit is further configured to obtain a mother speaker configuration instruction sent by the user terminal, where the mother speaker configuration instruction includes the identifier of the mother speaker and a value of at least one configuration item, and the at least one configuration item includes one or more of the following: volume setting and alarm setting. The processing unit is configured to configure the mother speaker according to the mother speaker configuration instruction. The processing unit is further configured to generate a child speaker configuration instruction according to the mother speaker configuration instruction, where the child speaker configuration instruction includes the identifier of the child speaker and a value of at least one configuration item, and the at least one configuration item includes one or more of the following: volume setting and alarm setting. The sending unit is further configured to send the child speaker configuration instruction to the child speaker. The receiving unit is further configured to receive a fourth synchronization success message sent by the child speaker responding to the child speaker configuration instruction. The sending unit is further configured to send a fifth synchronization success message to the user terminal based on the fourth synchronization success message received by the receiving unit.

According to a third aspect, a speaker interaction method is provided. The speaker interaction method is applied to a child speaker in a speaker system. The speaker system includes one mother speaker and at least one child speaker. A speaker interaction method is provided in this embodiment. The child speaker receives a voice input by a user. The child speaker converts the voice into voice data. The child speaker sends a first data packet that carries the voice data and an identifier of the child speaker to the mother speaker. The child speaker receives a second data packet sent by the mother speaker, where the second data packet carries the identifier of the child speaker and reply data responding to the voice data. Because the mother speaker can receive the voice data of the child speaker, when the child speaker meets the permission, the mother speaker transmits the voice data of the child speaker to the cloud server, then receives the reply data that is sent by the cloud server and that responds to the voice data, and feeds back the reply data to the child speaker, to implement interaction between speakers, thereby implementing linkage between the speakers.

In an example solution, before the child speaker receives a voice input by a user, the child speaker obtains a wake-up instruction, and enters a wake-up state according to the wake-up instruction; and the child speaker plays an alert tone to indicate the user that the child speaker enters the wake-up state.

In an example solution, before the child speaker receives a voice input by a user, the child speaker receives a multicast sniffing packet sent by the mother speaker; and the speaker sends a search result packet to the mother speaker responding to the multicast sniffing packet and establishes a connection between the speaker and the mother speaker.

In an example solution, the child speaker receives configuration information sent by the mother speaker, where the configuration information includes information about the identifier, initial volume, and alarm setting of the child speaker. The child speaker sets a configuration of the child speaker based on the configuration information. The child speaker sends a first synchronization success message to the mother speaker responding to the configuration information.

In an example solution, the child speaker receives current configuration information sent by the mother speaker, where the current configuration information includes the identifier of the child speaker and a value of at least one configuration item, and the at least one configuration item includes one or more of the following: volume setting and alarm setting. The child speaker sets a configuration of the child speaker based on the current configuration information. The child speaker sends a second synchronization success message to the mother speaker responding to the current configuration information.

In an example solution, after that the child speaker sends a second synchronization success message to the mother speaker responding to the current configuration information, the child speaker receives a child speaker configuration instruction sent by the mother speaker, where the child speaker configuration instruction includes the identifier of the child speaker and a value of at least one configuration item, and the at least one configuration item includes one or more of the following: volume setting and alarm setting; the child speaker sets a configuration of the child speaker according to the child speaker configuration instruction; and the child speaker sends a second synchronization success message to the mother speaker responding to the child speaker configuration instruction.

According to a fourth aspect, a speaker is provided. The speaker is applied to a child speaker in a speaker system, the speaker system includes one mother speaker and at least one child speaker, and the child speaker includes a receiving unit, a processing unit, and a sending unit. Functions implemented by each unit module provided in the embodiments are as follows. The receiving unit is configured to receive a voice input by a user. The processing unit is configured to convert the voice received by the receiving unit into voice data. The sending unit is configured to send a first data packet that carries the voice data and an identifier of the child speaker to the mother speaker. The receiving unit is configured to receive a second data packet sent by the mother speaker, where the second data packet carries the identifier of the child speaker and reply data responding to the voice data.

In an example solution, the receiving unit is further configured to obtain a wake-up instruction and enter a wake-up state according to the wake-up instruction. The sending unit is further configured to play an alert tone to indicate the user that the child speaker enters the wake-up state.

In an example solution, the receiving unit is further configured to receive a multicast sniffing packet sent by the mother speaker. The sending unit is further configured to send a search result packet to the mother speaker responding to the multicast sniffing packet received by the receiving unit and establish a connection between the speaker and the mother speaker.

In an example solution, the receiving unit is further configured to receive configuration information sent by the mother speaker, where the configuration information includes information about the identifier, initial volume, and alarm setting of the child speaker. The processing unit is further configured to set a configuration of the child speaker based on the configuration information. The sending unit is further configured to send a first synchronization success message to the mother speaker responding to the configuration information received by the receiving unit.

In an example solution, the receiving unit is further configured to receive current configuration information sent by the mother speaker, where the current configuration information includes the identifier of the child speaker and a value of at least one configuration item, and the at least one configuration item includes one or more of the following: volume setting and alarm setting. The processing unit is further configured to set a configuration of the child speaker based on the current configuration information received by the receiving unit. The sending unit is further configured to send a second synchronization success message to the mother speaker responding to the current configuration information received by the receiving unit.

In an example solution, the receiving unit is further configured to receive a child speaker configuration instruction sent by the mother speaker, where the child speaker configuration instruction includes the identifier of the child speaker and a value of at least one configuration item, and the at least one configuration item comprises one or more of the following: volume setting and alarm setting. The processing unit is further configured to set a configuration of the child speaker according to the child speaker configuration instruction received by the receiving unit. The sending unit is further configured to send a second synchronization success message to the mother speaker responding to the child speaker configuration instruction received by the receiving unit.

According to a fifth aspect, a speaker interaction method is provided. The speaker interaction method is applied to a speaker system, and the speaker system includes one mother speaker and at least one child speaker. A speaker interaction method is provided in this embodiment. A cloud server receives a third data packet sent by the mother speaker, where the third data packet carries an identifier of the mother speaker, an identifier of the child speaker, and the voice data. The cloud server parses the third data packet to obtain reply data responding to the voice data. The cloud server sends a fourth data packet to the mother speaker, where the fourth data packet carries the identifier of the mother speaker, the identifier of the child speaker, and the reply data responding to the voice data. Because the mother speaker can receive the voice data of the child speaker, when the child speaker meets the permission, the mother speaker transmits the voice data of the child speaker to the cloud server, then receives the reply data that is sent by the cloud server and that responds to the voice data, and feeds back the reply data to the child speaker, to implement interaction between speakers, thereby implementing linkage between the speakers.

With reference to the foregoing steps, in order to enable the cloud server to obtain the reply data responding to the voice data, an embodiment further provides a service customization function for the child speaker. In this way, vertical categories may be customized for different child speakers by using a user terminal. In an example solution, the cloud server receives a service customization instruction sent by a user terminal, where the service customization instruction includes a correspondence between the identifier of the mother speaker, the identifier of the child speaker, and a customized service type, and the service type at least includes one or more of the following vertical categories: life, entertainment, news, education, tools, and children. The obtaining reply data responding to the voice data includes obtaining a service type of a request of the voice data and obtaining the reply data based on the service type.

In an example solution, the cloud server feeds back an addition success instruction sent by the mother speaker to the user terminal, where the addition success instruction includes the identifier of the mother speaker and the identifier of the child speaker. The cloud server sets a default service type for the child speaker, and the service type at least includes one or more of the following vertical categories: life, entertainment, news, education, tools, and children. The obtaining reply data responding to the voice data includes obtaining a service type of a request of the voice data and obtaining the reply data based on the service type.

According to a sixth aspect, a cloud server is provided. The cloud server is applied to a speaker system, the speaker system includes one mother speaker and at least one child speaker, and the cloud server includes a receiving unit, a processing unit, and a sending unit. Functions implemented by each unit module provided in this embodiment are as follows. The receiving unit is configured to receive a third data packet sent by the mother speaker, where the third data packet carries an identifier of the mother speaker, an identifier of the child speaker, and the voice data. The processing unit is configured to parse the third data packet to obtain reply data responding to the voice data. The sending unit is configured to send a fourth data packet to the mother speaker, where the fourth data packet carries the identifier of the mother speaker, the identifier of the child speaker, and the reply data responding to the voice data.

In an example solution, the receiving unit is configured to receive a service customization instruction sent by a user terminal, where the service customization instruction includes a correspondence between the identifier of the mother speaker, the identifier of the child speaker, and a customized service type, and the service type at least includes one or more of the following vertical categories: life, entertainment, news, education, tools, and children. The processing unit is configured to obtain a service type of a request of the voice data and generate the reply data based on the service type.

In an example solution, the sending unit is configured to feed back an addition success instruction sent by the mother speaker to the user terminal, where the addition success instruction includes the identifier of the mother speaker and the identifier of the child speaker. The processing unit is configured to set a default service type for the child speaker, and the service type at least includes one or more of the following vertical categories: life, entertainment, news, education, tools, and children. The processing unit is configured to obtain a service type of a request of the voice data and generate the reply data based on the service type.

According to a seventh aspect, a speaker is provided. The speaker is applied to a mother speaker or a child speaker in a speaker system, the speaker system includes one mother speaker and at least one child speaker, and the speaker includes one or more processors and a communications interface. The communications interface is coupled to one or more processors. The speaker communicates with another device through a communication interface. The processor is configured to execute computer program code in a memory, where the computer program code includes an instruction, so that the speaker performs the speaker interaction method according to the first aspect, the third aspect, and various possible implementations of the first aspect and the third aspect.

According to an eighth aspect, a cloud server is provided. The cloud server is applied to a speaker system, the speaker system includes one mother speaker and at least one child speaker, and the cloud server includes one or more processors and a communications interface. The communications interface is coupled to one or more processors. The cloud server communicates with another device by using the communications interface. The processor is configured to execute computer program code in a memory, where the computer program code includes an instruction, so that the speaker performs the speaker interaction method according to the fifth aspect and possible implementations of the fifth aspect.

According to a ninth aspect, a computer-readable storage medium is further provided. The computer-readable storage medium stores an instruction. When the instruction is run on the speaker, the speaker is enabled to perform the speaker interaction method according to the first aspect, the third aspect, and the possible implementations of the first aspect.

According to a tenth aspect, a computer-readable storage medium is further provided. The computer-readable storage medium stores an instruction. When the instruction is run on a cloud server, the cloud server is enabled to perform the speaker interaction method according to the fifth aspect and the possible implementations of the fifth aspect.

According to an eleventh aspect, a computer program product including an instruction is further provided. When the computer program product runs on a speaker, the speaker is enabled to perform the speaker interaction method according to the first aspect, the third aspect, and the possible implementations of the first aspect.

According to a twelfth aspect, a computer program product including an instruction is further provided. When the computer program product runs on a cloud server, the cloud server is enabled to perform the speaker interaction method according to the fifth aspect and the possible implementations of the fifth aspect.

According to a thirteenth aspect, an embodiment further provides a chip system. The chip system includes a processor, configured to support a speaker in implementing the speaker interaction method in the first aspect, the third aspect, and the possible implementations of the first aspect. In a possible implementation, the chip system further includes a memory. The memory is configured to store a program instruction and data of the speaker. Further, the memory may alternatively not exist in the chip system. The chip system may include a chip or may include a chip and another discrete device. This is not limited in this embodiment.

According to a fourteenth aspect, an embodiment further provides a chip system. The chip system includes a processor configured to support a cloud server in implementing the speaker interaction method in the fifth aspect and the possible implementations of the fifth aspect. In a possible implementation, the chip system further includes a memory. The memory is configured to store a program instruction and data of the cloud server. Further, the memory may alternatively not exist in the chip system. The chip system may include a chip or may include a chip and another discrete device. This is not limited in this embodiment.

According to a fifteenth aspect, a speaker system is provided. The speaker includes the mother speaker according to the second aspect and the various possible implementations of the second aspect, and at least one child speaker according to the fourth aspect and the various possible implementations of the fourth aspect.

For descriptions of the seventh aspect to the fifteenth aspect and the implementations of the seventh aspect to the fifteenth aspect in the embodiments, refer to the detailed descriptions in the first aspect to the sixth aspect and the implementations of the first aspect to the sixth aspect. Details are not described herein again.

These aspects or other aspects are more concise and comprehensible in the following descriptions.

BRIEF DESCRIPTION OF DRAWINGS

To describe the solutions in the embodiments or the prior art more clearly, the following briefly describes the accompanying drawings for describing the embodiments.

DETAILED DESCRIPTION OF THE EMBODIMENTS

The following clearly and completely describes the solutions in the embodiments with reference to the accompanying drawings in the embodiments.

In description of the embodiments, "I" means "or" unless otherwise specified. For example, A/B may represent A or B. Further, "and/or" describes only an association relationship for describing associated objects and represents that three relationships may exist. For example, A and/or B may represent the following three cases: only A exists, both A and B exist, and only B exists. In addition, in the descriptions of the embodiments, "a plurality of" means two or more than two. In addition, to clearly describe the solutions in the embodiments, "first", "second", and the like in the embodiments are used to distinguish between different objects, or are used to distinguish between different processing of a same object, but are not used to describe a particular order of the objects.

Figure 1:
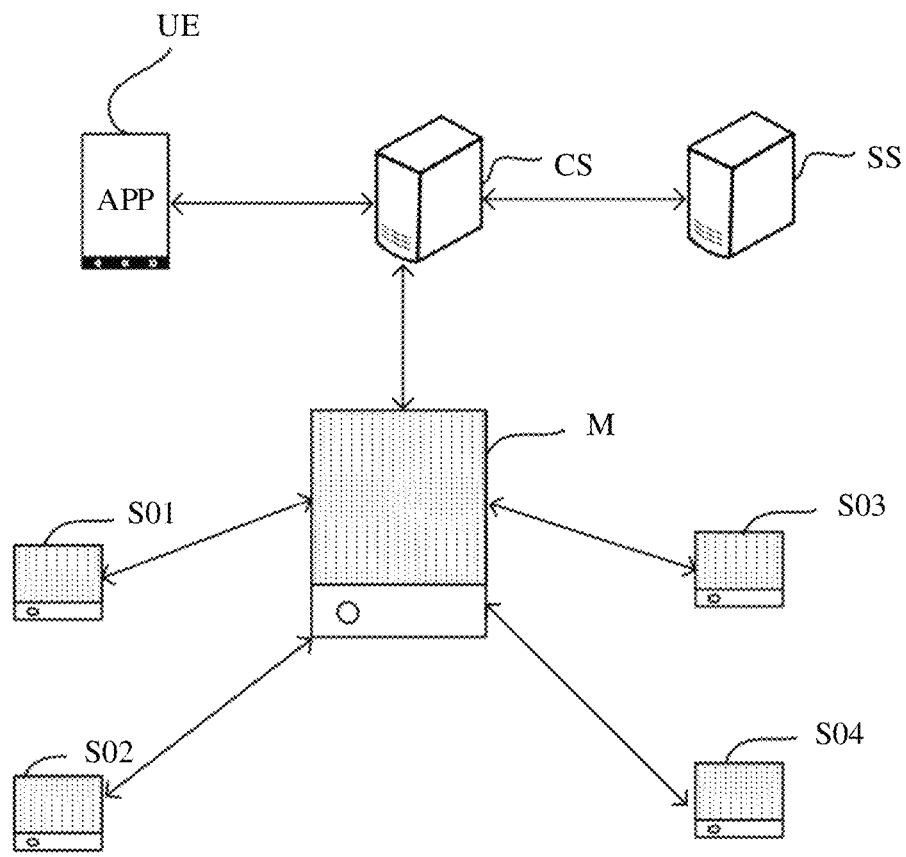
FIG. 1 is a schematic diagram of a system architecture to which an embodiment is applied.

Referring to FIG. 1, an embodiment is applied to the following system architecture. The system architecture includes user equipment UE, a cloud server CS, and a speaker system. The speaker system includes a mother speaker M and at least one child speaker (S01 to S04, FIG. 1 shows only four child speakers, but may also include more or fewer child speakers, as desired). An application APP (such as a software application) capable of interacting with the speaker system may be loaded on the user terminal UE, where the user terminal UE may interact with the mother speaker M of the speaker system through the cloud server CS. In addition, the user terminal UE may further directly interact with the mother speaker M (or the child speakers S01 to S04) of the speaker system in a wireless or wired manner. For example, the user terminal UE may set a connection to the mother speaker M (or the child speakers S01 to S04) by using Bluetooth or a data cable. In addition, the cloud server CS may further be connected to a third-party cloud server SS, to obtain a resource played by the speaker system from the third-party cloud server SS.

Further, a specific form of the user terminal is not limited in this embodiment. For example, the user terminal may be a mobile phone, a tablet computer, a personal computer PC, a personal digital assistant PDA, a smartwatch, a netbook, a wearable electronic device, or the like. The specific form of the user terminal is not limited in this embodiment.

Figure 2:
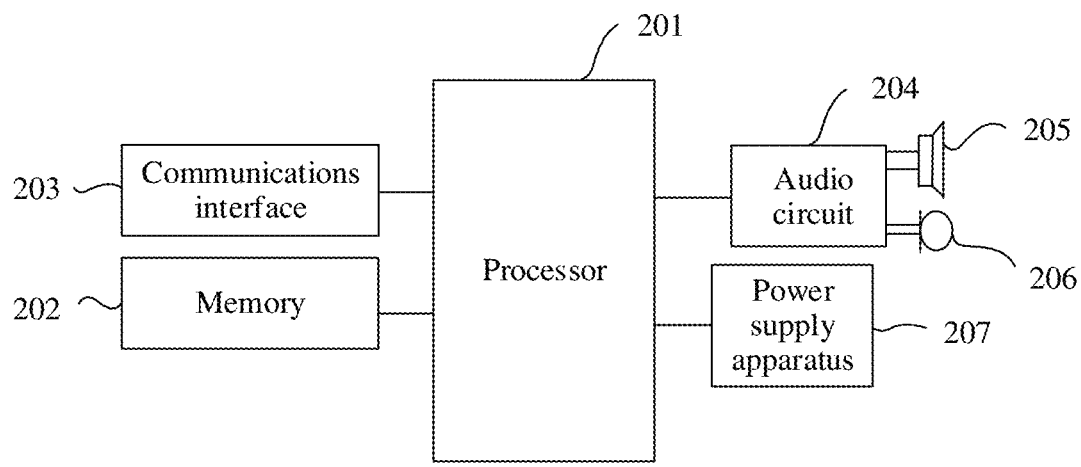
FIG. 2 is a schematic structural diagram of a speaker according to an embodiment.

The speaker provided in this embodiment may be a mother speaker or a child speaker. As shown in FIG. 2, the speaker may include a processor 201, a memory 202, a communications interface 203, an audio circuit 204, a loudspeaker 205, a microphone 206, and the like. These components may perform communication by using one or a plurality of communications buses or signal cables (not shown in the figure). In addition, the communications interface 203 is configured to communicate with another speaker, for example, interaction between the child speaker and the mother speaker or interaction between the speaker and the user terminal. In this case, the communications interface 203 may be a Bluetooth apparatus or a signal transmission line interface. The communications interface 203 may be a radio frequency circuit or a Wi-Fi apparatus, and is configured to perform interaction between the mother speaker and the cloud server or perform interaction between the mother speaker and the child speaker.

The following describes the components of the speaker in detail with reference to FIG. 2.

The processor 201 is a control center of the speaker and connects to various components of the speaker by using various interfaces and lines. The processor 101 executes various functions of the speaker and processes data by running or executing an application program stored in the memory 202 and invoking data that is stored in the memory 202. In some embodiments, the processor 201 may include one or more processing units.

The memory 202 is configured to store an application and data. The processor 201 runs the application and the data that are stored in the memory 202, to perform various functions of the speaker and process data. The memory 202 mainly includes a program storage area and a data storage area. The program storage area may store an operating system, and an application required by at least one function (for example, a sound playing function or a voice collection function). The data storage area may store data (for example, audio data) created based on use of the speaker. In addition, the memory 202 may include a high-speed random access memory (RAM) and may further include a non-volatile memory such as a magnetic disk storage device, a flash memory device, or another volatile solid-state storage device. The memory 202 may store various operating systems. The memory 202 may be independent and is connected to the processor 201 by using the communications bus; or the memory 202 may be integrated with the processor 201.

The communications interface 203 may provide an audio circuit between a user and the speaker. The audio frequency circuit 204 may convert received audio data into an electrical signal, and transmit the electrical signal to the loudspeaker 205, and the loudspeaker 205 converts the electrical signal into a sound signal for output. In addition, the microphone 206 converts a collected sound signal (for example, a voice uttered by a user) into an electrical signal, and the audio frequency circuit 204 receives the electrical signal, converts the electrical signal into audio data (or voice data), and outputs the audio data. For example, the child speaker sends the voice data to the mother speaker, alternatively, the mother speaker sends the voice data to the cloud server or the like, or outputs the voice data to the memory 202 for further processing.

The speaker may further include the power supply apparatus 207 (for example, a battery and a power supply management chip) that supplies power to the components. The battery may be logically connected to the processor 201 by using the power supply management chip, so that functions such as charging, discharging, and power consumption management are implemented by using the power supply apparatus 207.

A structure of the device shown in FIG. 2 does not constitute a limitation on the speaker. The speaker may include more or fewer components than those shown in the figure, or combine some components, or have different component arrangements.

Figure 3:
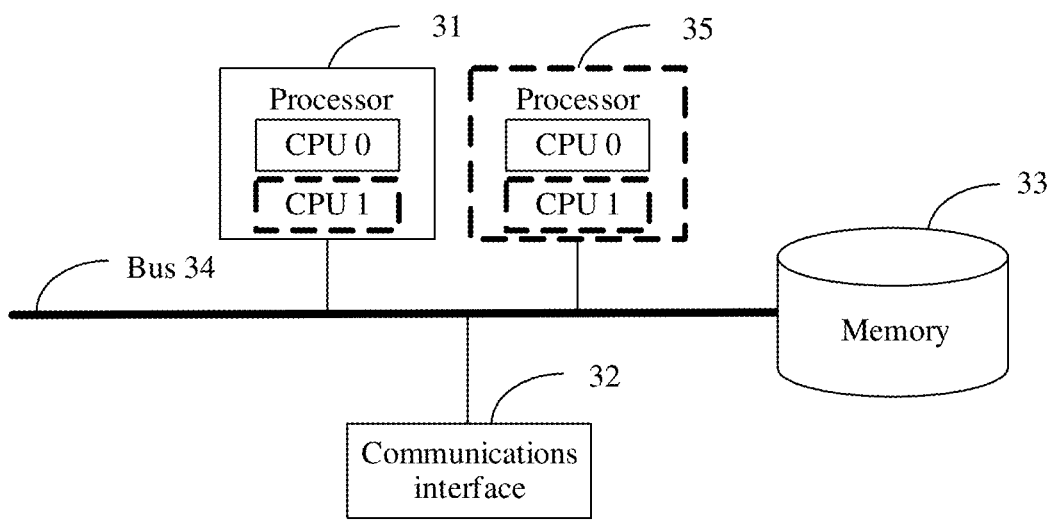
FIG. 3 is a schematic structural diagram of a cloud server according to an embodiment.

FIG. 3 is a schematic composition diagram of a cloud server according to an embodiment. As shown in FIG. 3, the cloud server may include at least one processor 31 and a communications interface 32.

The following describes the components of the cloud server in detail with reference to FIG. 3.

The processor 31 is a control center of the cloud server and may be one processor or may be a collective term of a plurality of processing elements. For example, the processor 31 is a CPU, or may be an application-specific integrated circuit (ASIC) or may be one or more integrated circuits configured to implement this embodiment, for example, one or more microprocessors DSPs or one or more field programmable gate arrays (FPGAs). Additionally, the cloud server may further include a memory 33.

The processor 31 may independently perform functions of the cloud server in this embodiment or may perform various functions of the cloud server by running or executing a software program stored in the memory 33 and invoking data stored in the memory 33.

During implementation, in an embodiment, the processor 31 may include one or more CPUs, for example, a CPU 0 and a CPU 1 shown in the figure.

In an implementation, in an embodiment, the cloud server may include a plurality of processors, for example, the processor 31 and a processor 35 shown in FIG. 3. Each of the processors may be a single-core processor (single-CPU) or may be a multi-core processor (multi-CPU). The processor herein may be one or more devices, circuits, and/or processing cores for processing data (for example, computer program instructions).

The memory 33 may be a read-only memory (ROM) or another type of static storage device that can store static information and instructions, or RAM or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 33 is not limited thereto. The memory 33 may exist independently and is connected to the processor 31 through a bus 34. Alternatively, the memory 33 may be integrated with the processor 31.

The memory 33 is configured to store a software program for performing the solution in this embodiment, and the processor 31 controls execution of the software program.

The communications interface 32 is configured to communicate with another device. For example, it can be used to communicate with a mother speaker and a third-party cloud server.

The bus 34 may be an industry standard architecture bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 3, but this does not mean that there is only one bus or only one type of bus.

A structure of the device shown in FIG. 3 does not constitute a limitation on the cloud server. The terminal device may include more or fewer components than those shown in the figure, or may combine some components, or may have different component arrangements.

Figure 4:
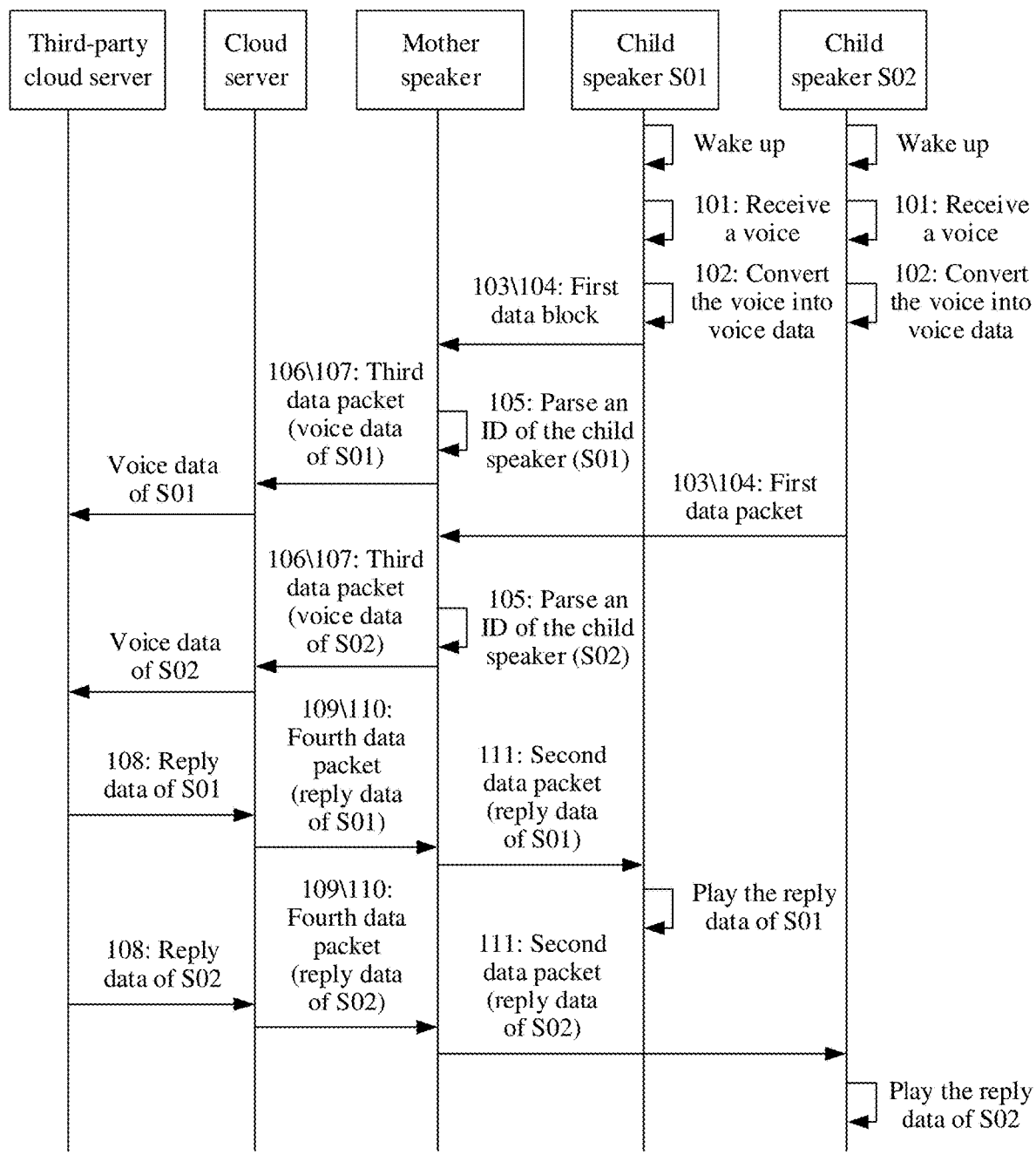
FIG. 4 is a schematic diagram of a speaker interaction method according to an embodiment.

Based on the foregoing system architecture and hardware, an embodiment provides a speaker interaction method. Referring to FIG. 4, the method includes the following steps.

101: A child speaker receives a voice input by a user.

For example, referring to FIG. 1, a speaker system includes child speakers S01 and S02 located in different rooms, and therefore a user 1 located in a room in which the child speaker S01 is located may input a voice to the child speaker S01, and a user 2 in a room in which child speaker S02 is located can input a voice to the child speaker S02. It can be noted that, before step 101, the child speaker needs to be powered on first, and the child speaker needs to be woken up. In other words, the child speaker is controlled to enter a voice receiving state to wait for receiving a voice input by the user. For example, before step 101, the child speaker obtains a wake-up instruction, and enters a wake-up state according to the wake-up instruction, and the child speaker plays an announcement, to prompt the user that the child speaker is in the wake-up state. The user may trigger a key on the child speaker to control the child speaker to enter the wake-up state, or the child speaker detects a specific wake-up word entered by the user to enter the wake-up state. For example, when detecting that the user 1 inputs a wake-up keyword "power on", the child speaker S01 plays "hey", to prompt the user that the child speaker S01 enters the wake-up state, and S01 waits for the user to input a voice. Further, the child speaker S02 may enter the wake-up state by using a control mechanism the same as that of S01 or enter the wake-up state in another manner.

102: The child speaker converts the voice into voice data.

103: The child speaker sends a first data packet that carries the voice data and an identifier of the child speaker to the mother speaker.

104: The mother speaker receives the first data packet sent by the child speaker, where the first data packet includes the identifier of the child speaker and the voice data, and the voice data is a data of the voice input by the user.

The child speaker may pack the voice data and the identifier (for example, an ID) of the child speaker into a data packet and send the data packet to the mother speaker. For example, the child speaker and the mother speaker may communicate with each other by using Wi-Fi or Bluetooth. This is not limited in this embodiment. The child speakers S01 and S02 are still used as an example, an example of a content format of the first data packet is shown in the following Table 1.

TABLE 1

| ID of a child speaker | Voice data |
|---|---|
| S01 | xxxxxx |
| ID of a child speaker | Voice data |
| S02 | xxxxxx |

105: The mother speaker parses the first data packet to obtain the identifier of the child speaker.

106: The mother speaker sends a third data packet to a cloud server when determining, based on the identifier of the child speaker, that the child speaker meets permission, where the third data packet carries an identifier of the mother speaker, the identifier of the child speaker, and the voice data.

For example, after receiving a data packet sent by S01 and a data packet sent by S02, the mother speaker parses out IDs of the child speakers (S01 and S02), and respectively queries permission of the two child speakers based on the IDs of the child speakers, where the mother speaker may store a permission list of the child speakers, and the permission list can store a mapping relationship between the ID of the child speaker and specific permission. When the permission is met, the data packets sent by the two child speakers adding with an ID of the mother speaker are respectively packed into data packets (the third data packet), and the data packets are respectively reported to the cloud server. An example of a content format of the third data packet herein is shown in the following Table 2.

TABLE 2

| ID of a mother speaker | ID of a child speaker | Voice data |
|---|---|---|
| M001 | S01 | xxxxxx |
| ID of a mother sound box | ID of a child sound box | Voice data |
| M001 | S02 | xxxxxx |

107: The cloud server receives the third data packet sent by the mother speaker.

108: The cloud server parses the third data packet to obtain reply data responding to the voice data.

In step 107, the cloud server receives the data packet sent by the mother speaker, and in step 108, the cloud server parses the data packet to obtain the voice data and performs voice recognition. For example, for a voice recognition result of voice data corresponding to the child speaker S01, the cloud server obtains a vertical category subscribed by the child speaker S01. The vertical category herein may be a service type customized for the child speaker S01, for example, life, entertainment, news, education, tools, or children. Then, the cloud server obtains a corresponding service from the third-party cloud server and generates reply data responding to the voice data of the child speaker S01. For the child speaker S02, reply data responding to voice data of the child speaker S02 is generated in a similar manner.

109: The cloud server sends a fourth data packet to the mother speaker, where the fourth data packet carries the identifier of the mother speaker, the identifier of the child speaker, and the reply data responding to the voice data.

Based on the reply data obtained in step 108, the cloud server packs the ID of the mother speaker, the ID of the child speaker, and the reply data into a data packet (the fourth data packet) and returns the data packet to the mother speaker. An example of a content format of the fourth data packet herein is shown in the following Table 3.

TABLE 3

| ID of a mother speaker | ID of a child speaker | Reply data |
|---|---|---|
| M001 | S01 | xxxxxx |
| ID of a mother sound box | ID of a child sound box | Reply data |
| M001 | S02 | xxxxxx |

110: The mother speaker receives the fourth data packet sent by the cloud server, where the fourth data packet carries the identifier of the mother speaker, the identifier of the child speaker, and the reply data responding to the voice data.

111: The mother speaker parses the fourth data packet to obtain a second data packet, and sends the second data packet to the child speaker, where the second data packet carries the identifier of the child speaker and the reply data responding to the voice data.

For example, the mother speaker receives the data packet replied by the cloud server, parses an ID field of the child speaker, and returns the reply data in the data packet to the child speaker. For example, for the fourth data packet corresponding to the child speaker S01, the mother speaker packs the parsed ID of the child speaker and the reply data into a second data packet, where the second data packet carries an identifier of the child speaker S01 and reply data responding to the voice data of the child speaker S01. For the child speaker S02, a data packet of the child speaker S02 is generated in a similar manner. An example of a content format of the second data packet herein is shown in the following Table 4.

TABLE 4

| ID of a child speaker | Reply data |
|---|---|
| S01 | xxxxxx |
| ID of a child sound box | reply data |
| S02 | xxxxxx |

Finally, the child speaker S01 and the child speaker S02 separately receive the data packet responding to the mother speaker, parse out the reply data, and play the reply data to the user.

Because the mother speaker can receive the voice data of the child speaker, when the child speaker meets the permission, the mother speaker transmits the voice data of the child speaker to the cloud server, then receives the reply data that is sent by the cloud server and that responds to the voice data, and feeds back the reply data to the child speaker, to implement interaction between speakers, thereby implementing linkage between the speakers.

Figure 5A:
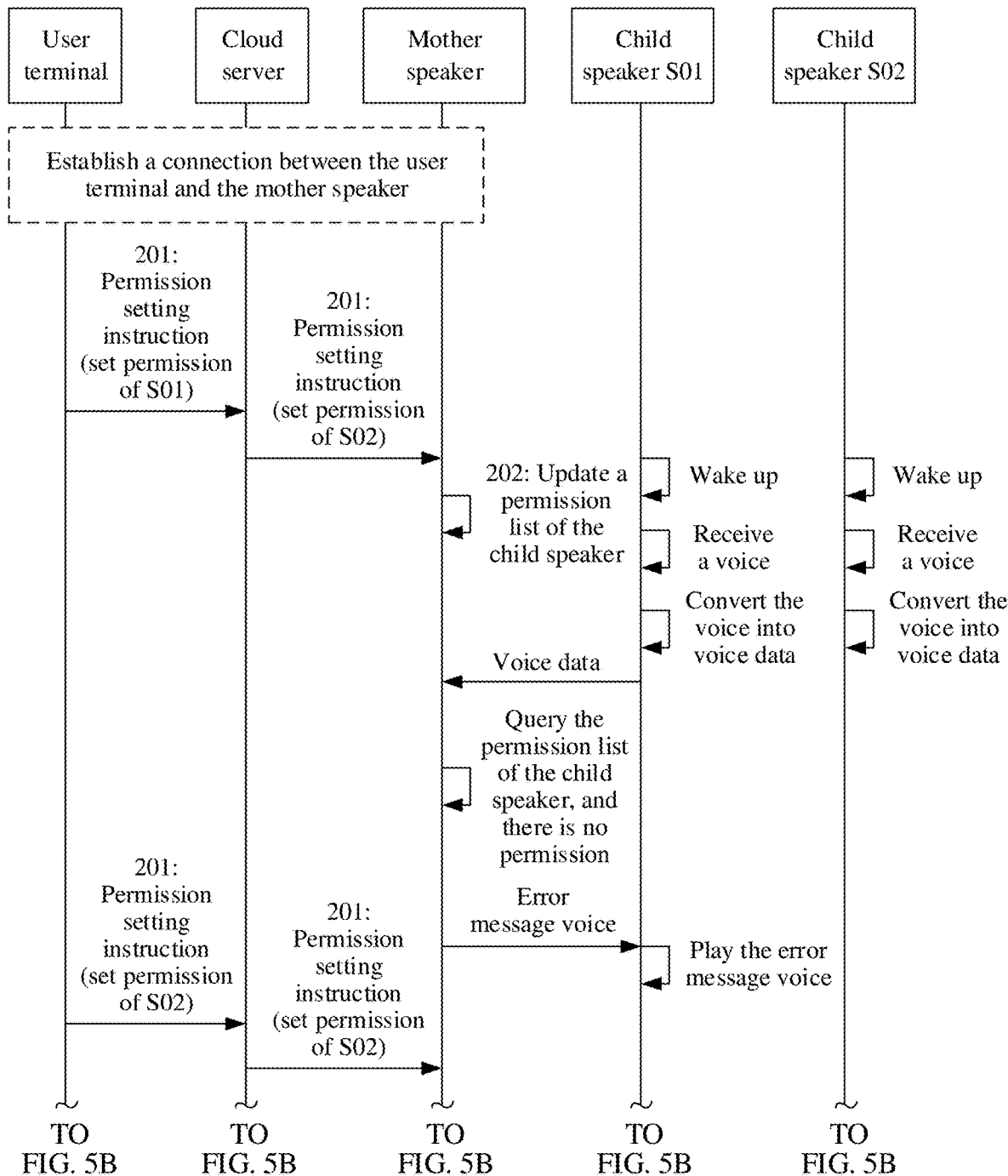
FIG. 5A is a schematic diagram of a speaker interaction method according to another embodiment.
Figure 5B:
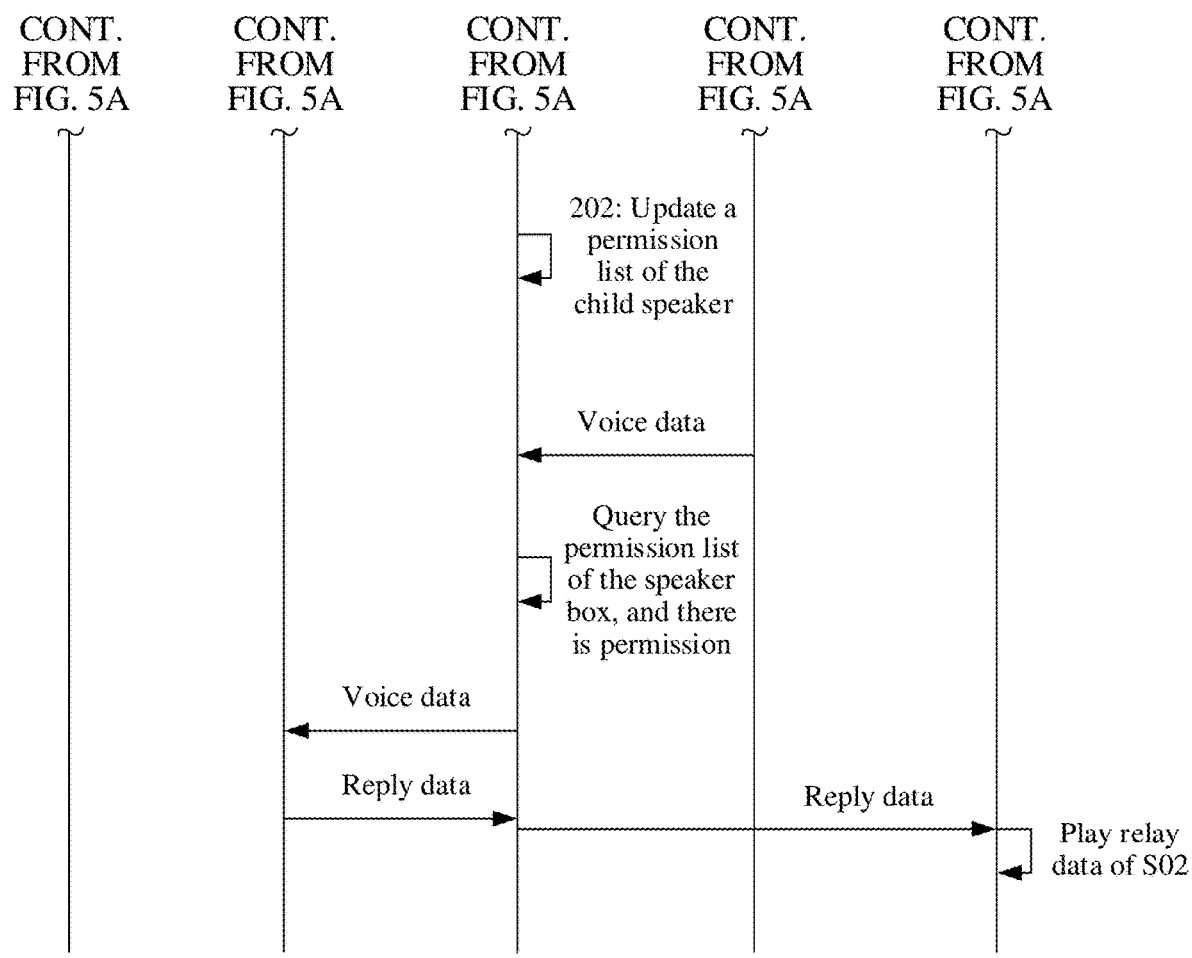
FIG. 5B is a schematic diagram of a speaker interaction method according to another embodiment.

To determine the permission of the child speaker in the foregoing step 106, an embodiment further provides a solution for controlling the permission of the child speaker. Referring to FIG. 5A and FIG. 5B, the solution includes the following steps.

201: A user terminal generates a permission setting instruction according to an instruction input by a user and sends the permission setting instruction to a mother speaker.

The user may generate the permission setting instruction by inputting an instruction in an APP running on the user terminal, where the APP may be a control APP of the speaker system in FIG. 1. The user terminal may send the permission setting instruction to the mother speaker by using the cloud server, or the user terminal may directly establish a wireless connection to the mother speaker and send the permission setting instruction to the mother speaker. The permission setting instruction is used to set the following permission of the child speaker: whether the child speaker is available. The permission further includes a period of time during which the child speaker is available, or a period of time during which the child speaker is unavailable. Further, before sending the permission setting instruction to the mother speaker, the user terminal first needs to establish a connection to the mother speaker.

For example, the permission setting instruction may use a format shown in the following Table 5.

TABLE 5

| ID of a mother speaker | ID of a child speaker | Instruction type | Whether available | Start time | End time |
|---|---|---|---|---|---|
| M001 | S01 | 1 | 0 | 0 | 0 |
| M001 | S02 | 1 | 1 | 8:00 | 12:00 |
| M002 | S01 | 1 | 1 | 0 | 0 |
| M002 | S02 | 1 | 1 | 20:00 | 21:30 |

ID of a mother speaker indicates an ID of a mother speaker corresponding to a child speaker whose permission is to be set.

ID of a child speaker indicates an ID of a child speaker whose permission is to be set.

Instruction type indicates a type of a delivered instruction. For example, 1 indicates a permission setting instruction. A definition of the instruction type is shown in the following Table 6.

TABLE 6

| Instruction type | Meaning |
|---|---|
| 1 | Set child speaker permission, for example, a permission setting instruction |
| 2 | Customize a service vertical category for a child speaker, for example, a service customization instruction |
| 3 | Add a child speaker, for example, a child speaker addition instruction or an addition success instruction |
| 4 | Set configuration synchronization between a child speaker and a mother speaker, for example, a synchronous configuration enabling instruction |
| 5 | Modify a mother speaker configuration, for example, a mother speaker configuration instruction |
| 6 | Modify a child speaker configuration, for example, a child speaker configuration instruction |

Only the instruction type 1 is used in this embodiment, and the instruction type 1 is described in detail when instruction types 2 to 6 are applied in the following other embodiments.

Whether available indicates use permission of a child speaker. A value 0 indicates that the child speaker is unavailable, and a value 1 indicates that the child speaker is available.

Start time indicates a time when permission takes effect. If a value of "Whether available" permission is 0, it indicates a start time when the child speaker is unavailable. If a value of "Whether available" permission is 1, it indicates a start time when the child speaker is available.

End time indicates a time when permission expires. If a value of "Whether available" permission is 0, it indicates an end time when the child speaker is unavailable. If a value of "Whether available" permission is 1, it indicates an end time when the child speaker is available.

In addition, if both the start time and the end time are 0, it indicates that the child speaker is available or unavailable in all time (specifically, with reference to an indication of whether a field is available).

202: The mother speaker obtains a permission setting instruction sent by the user terminal, where the permission setting instruction is used to set the permission of the child speaker.

For example, the mother speaker receives the permission setting instruction delivered by the APP of the user terminal, and updates a permission list, of the child speaker, maintained by the mother speaker. A format of the permission list of the child speaker is shown in the following Table 7.

TABLE 7

| ID of a child speaker | Whether available | Start time | End time |
|---|---|---|---|
| S01 | 0 | 0 | 0 |
| S02 | 1 | 8:00 | 12:00 |
| S03 | 1 | 0 | 0 |
| S04 | 0 | 20:00 | 21:30 |

The meaning of a field in Table 7 is the same as the meaning of the field in Table 6.

Then, the mother speaker and the child speaker interact with each other according to the foregoing manner of steps 101 to 111. Because permission is set for each child speaker in step 202, in step 106, after receiving the data packet that carries the voice data and that is reported by the child speaker, the mother speaker queries, based on the ID of the child speaker, a permission list of the child speaker to check whether there is use permission of a corresponding child speaker. If there is the use permission (for example, the child speaker S02), the mother speaker reports the voice data to the cloud server, and normally obtains reply data responding to the voice data. If there is no the use permission (for example, the child speaker S01), the mother speaker returns an error message voice to the child speaker. After receiving the reply data, responding to the voice data, of the mother speaker, if the child speaker is available, the child speaker plays the reply data. If the child speaker unavailable, the child speaker plays an error message, for example, "The current speaker is unavailable.", "The current child speaker is unavailable from 20:00 to 21:30.", or "The current child speaker is available only from 8:00 to 12:00."

Figure 6A:
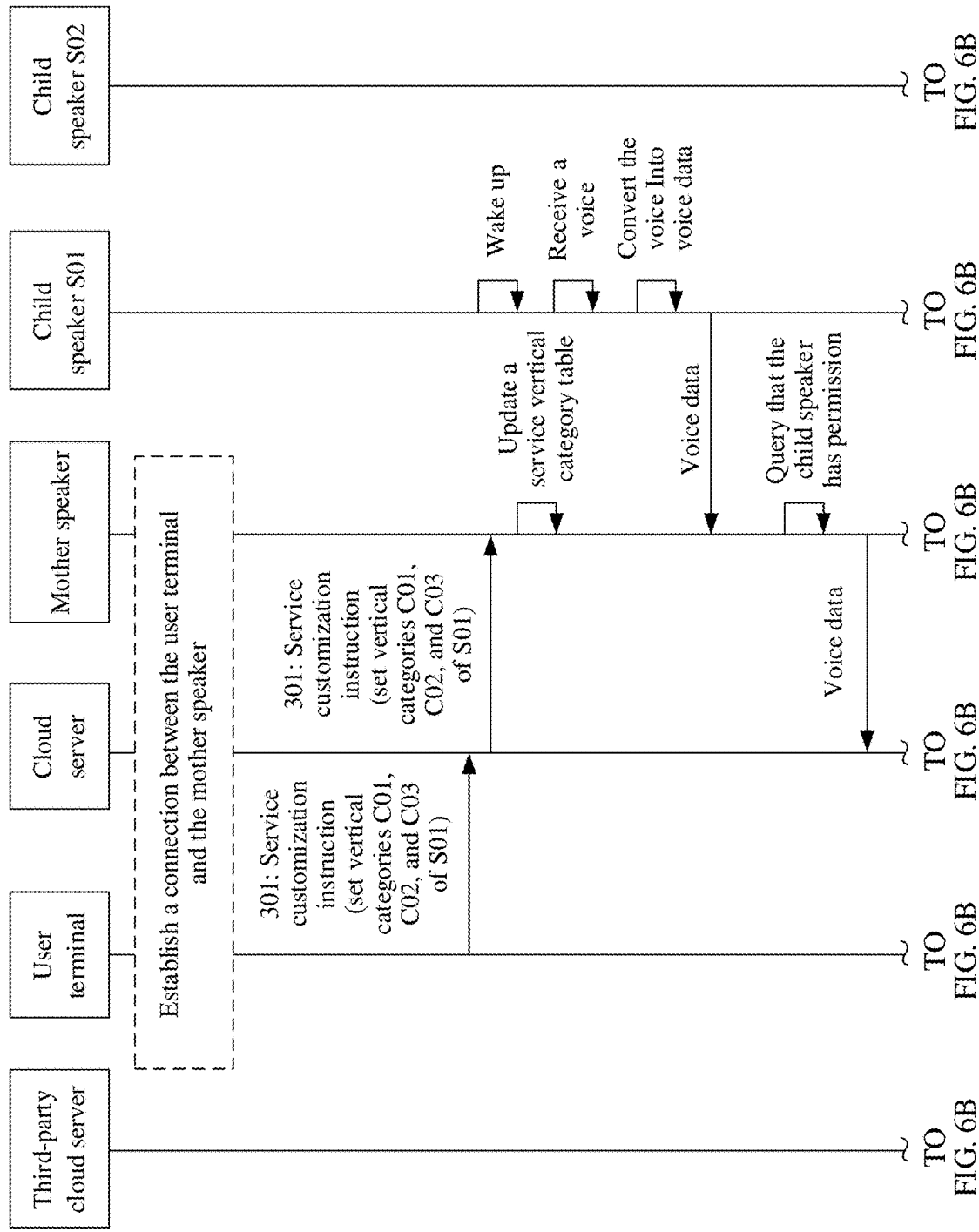
FIG. 6A is a schematic diagram of a speaker interaction method according to still another embodiment.
Figure 6B:
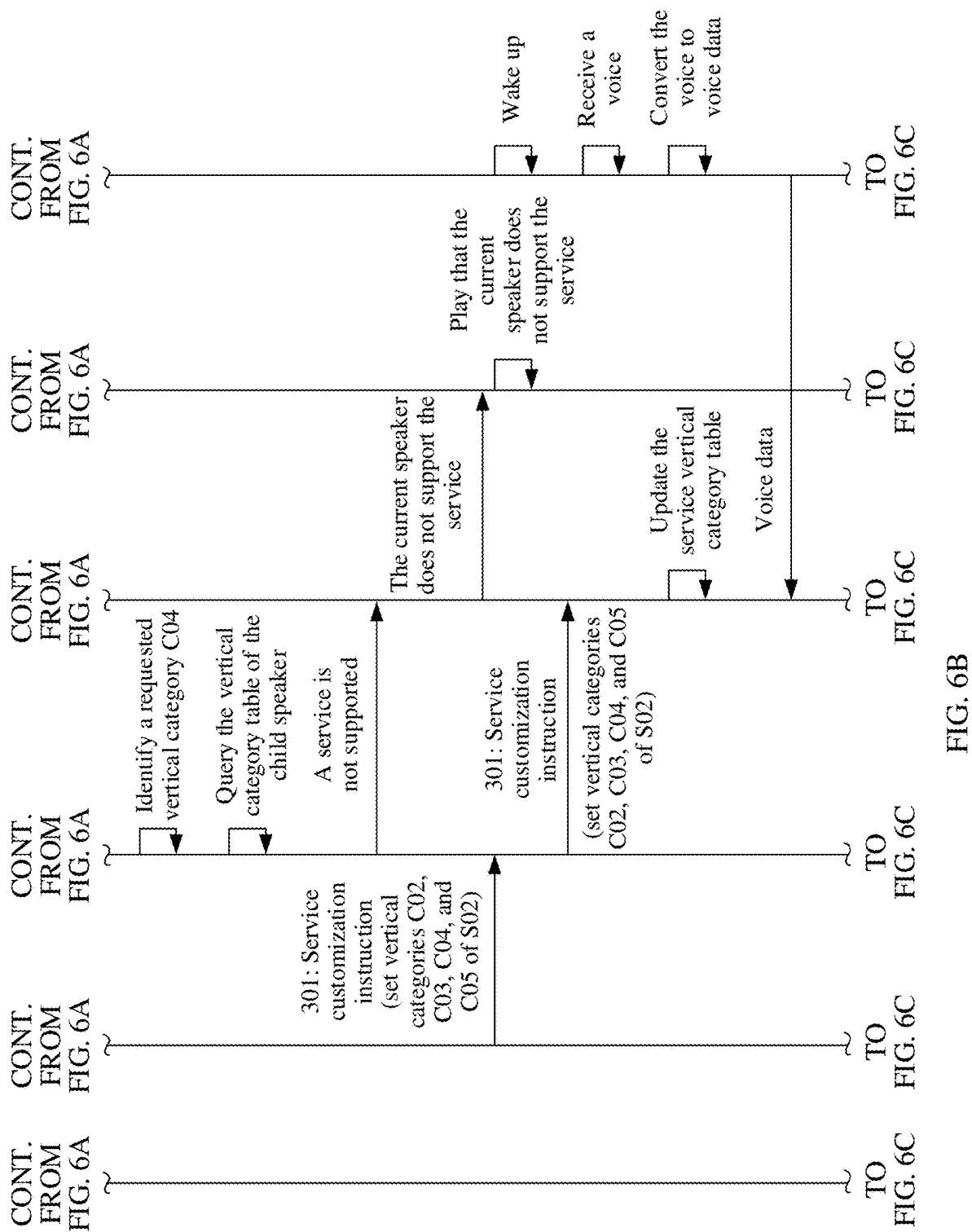
FIG. 6B is a schematic diagram of a speaker interaction method according to still another embodiment.
Figure 6C:
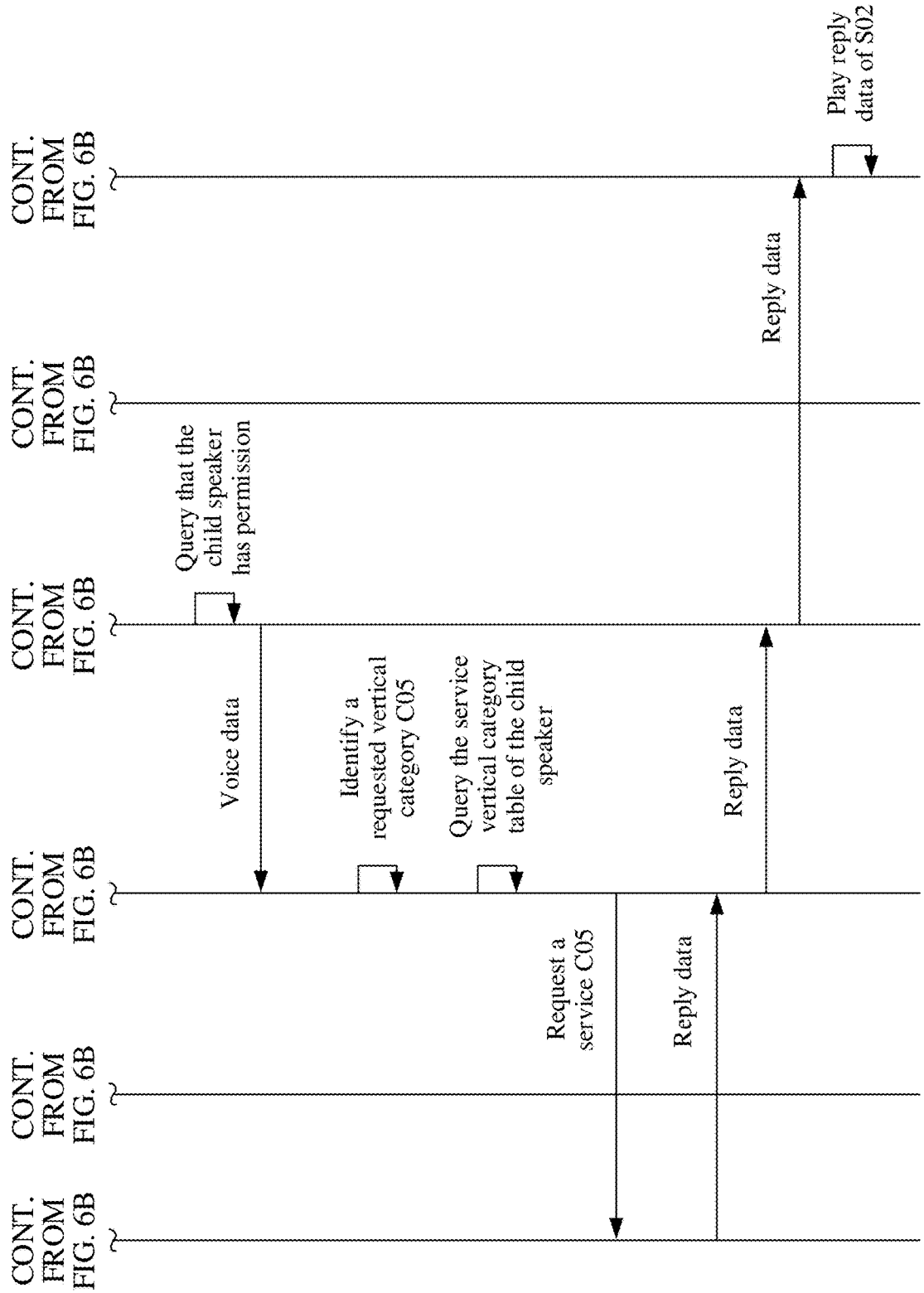
FIG. 6C is a schematic diagram of a speaker interaction method according to still another embodiment.

With reference to the foregoing steps, in order to enable the cloud server to obtain the reply data responding to the voice data, an embodiment further provides a service customization function for the child speaker. In this way, vertical categories may be customized for different child speakers by using the user terminal. For example, referring to FIG. 6A, FIG. 6B, and FIG. 6C, the following steps are provided.

301: A user terminal generates a service customization instruction according to an instruction input by a user and sends the service customization instruction to a cloud server.

For example, the service customization instruction includes a correspondence between an identifier of a mother speaker, an identifier of a child speaker, and a customized service type, and the service type at least includes one or more of the following vertical categories: life, entertainment, news, education, tools, and children. The user may trigger a vertical category check box provided by an APP of the user terminal, and select a vertical category supported by the child speaker. The service customization instruction may use a format shown in the following Table 8.

TABLE 8

| ID of a mother speaker | ID of a child speaker | Instruction type | ID list of a vertical category |
|---|---|---|---|
| M001 | S01 | 2 | [C01, C02, C03] |

ID of a mother speaker indicates an ID of a mother speaker corresponding to a child speaker whose vertical category is to be customized.

ID of a child speaker indicates an ID of a child speaker whose vertical category is to be customized.

Instruction type indicates a type of a service customization instruction. For example, a value 2 indicates a service customization instruction.

ID list of a vertical category indicates an ID list of service vertical categories available for a child speaker. A definition of a type of the vertical category is similar to that in Table 9.

TABLE 9

| ID of a vertical category | Definition of a vertical category | Example of a service |
|---|---|---|
| C01 | life | weather query, road condition information, and diet encyclopedia, or the like |
| C02 | entertainment | music, novels, Quyi works, or the like |
| C03 | news | political news, sports news, military news, or the like |
| C04 | education | English channels, encyclopedia Q&A, voice courses, or the like |
| C05 | tools | alarm setting, memos, calculators, or the like |
| C06 | children | ancient poems, stories, 100,000 Whys, or the like |

302: The cloud server receives the service customization instruction sent by the user terminal.

The cloud server may maintain one service vertical category table of the child speaker, and a format of the service vertical category table of the child speaker is shown in the following Table 10.

TABLE 10

| ID of a mother speaker | ID of a child speaker | ID list of a vertical category |
|---|---|---|
| M001 | S01 | C01, C02, C03 |
| M001 | S02 | C02, C03, C04, C05 |
| M002 | S01 | C01, C04, C05 |
| M002 | S02 | C04, C05, C06 |

Then, the mother speaker and the child speaker interact with each other according to the foregoing manner of steps 101 to 111. In step 108, a service type of a voice data request is obtained for the cloud server, and the reply data is obtained based on the service type.

For example, the cloud server identifies, based on the voice data, that a service type requested by the user is the vertical category C04, finds, by querying the service vertical category table of the child speaker, that a child speaker S01 does not customize the vertical category C04, and replies, to the mother speaker, that the service is not supported. The mother speaker receives the reply from the cloud server and sends the reply to the child speaker S01. The child speaker S01 receives the reply and plays an announcement "The current speaker does not support the service." If the vertical category requested by the child speaker is customized, a table is queried in the cloud server to obtain vertical category support, and the cloud server obtains a corresponding service from a third-party cloud server, and finally replies to a corresponding child speaker by using the reply data. For example, the cloud server identifies voice data sent by a child speaker S02, determines that a vertical category requested by the child speaker S02 is C05, finds, by querying the service vertical category table of the child speaker, that the child speaker S02 customizes the vertical category C05, and then obtains the reply data from the third-party cloud server and replies the reply data to the mother speaker. The mother speaker receives the reply from the cloud server and sends the reply to the child speaker S02. The child speaker S02 receives the reply and plays the reply data.

Figure 7:
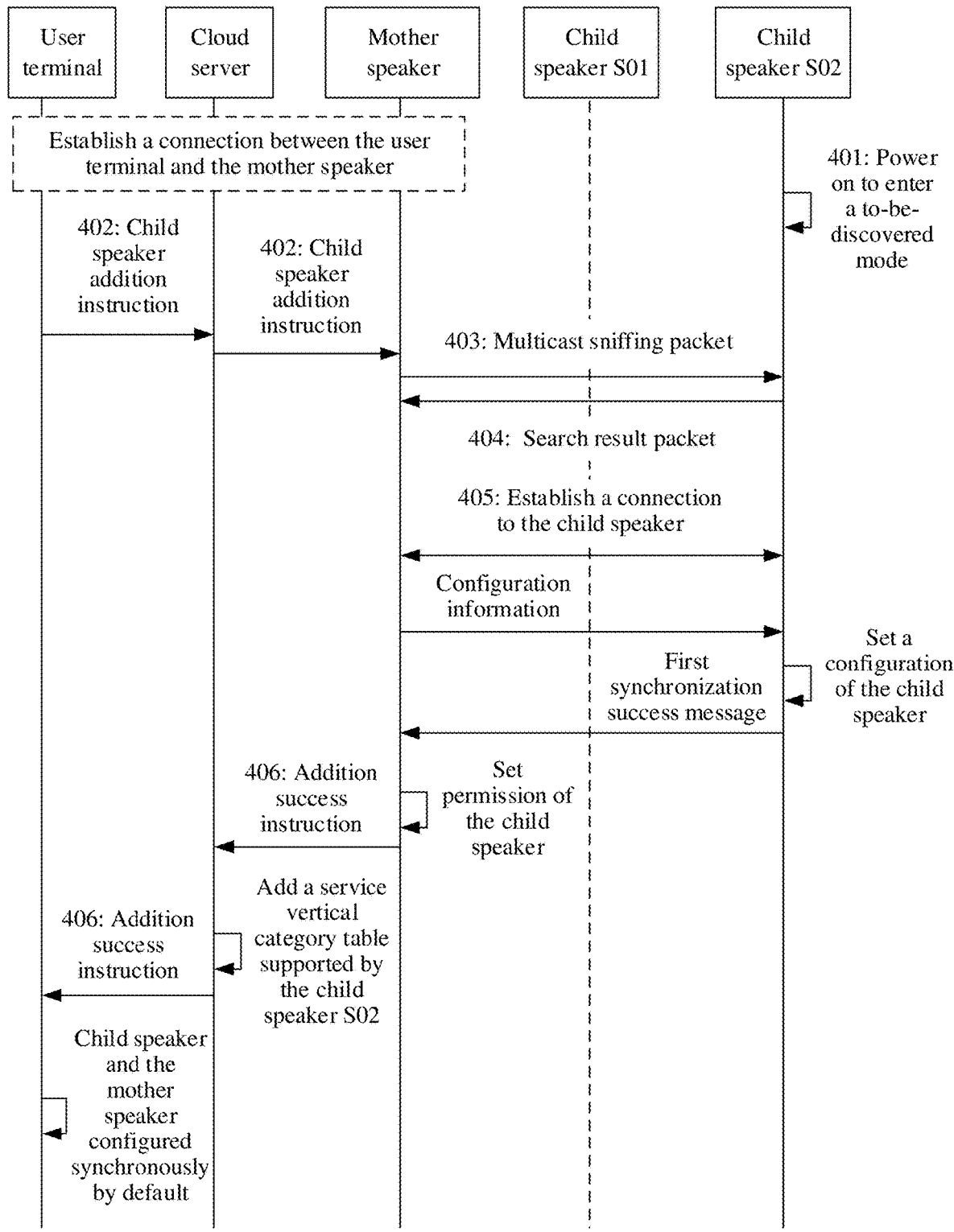
FIG. 7 is a schematic diagram of a speaker interaction method according to yet another embodiment.

In addition, an embodiment further provides a manner of adding a child speaker. Referring to FIG. 7, an example in which the child speaker S02 is added is used for description, and the following steps are included.

401: Power on the newly-added child speaker to enter a to-be-discovered mode.

402: A user terminal sends a child speaker addition instruction to a mother speaker, where the child speaker addition instruction includes an identifier of the mother speaker.

A format of the child speaker addition instruction is shown in the following Table 11.

TABLE 11

| ID of a mother speaker | Instruction type |
|---|---|
| M001 | 3 |

ID of a mother speaker indicates an ID of a mother speaker to which a child speaker is to be added.

Instruction type indicates an operation type of an instruction. For example, a value 3 indicates adding a child speaker.

The user terminal may send the child speaker addition instruction to the mother speaker by using a cloud server, or the user terminal may directly establish a wireless connection to the mother speaker and send the child speaker addition instruction to the mother speaker.

403: The mother speaker sends a multicast sniffing packet according to the child speaker addition instruction.

In step 403, the mother speaker initiates a child speaker discovery process, sends the multicast sniffing packet, and discovers a surrounding child speaker in the to-be-discovered mode.

404: The child speaker sends a search result packet to the mother speaker responding to the multicast sniffing packet.

405: The mother speaker adds an identifier of the child speaker to the child speaker based on the search result packet and establishes a connection to the child speaker.

For example, the mother speaker allocates an identifier ID-S02 to the newly-added child speaker, and establishes a connection to the child speaker. For example, the mother speaker sends a connection request to the child speaker, and the child speaker returns a connection success message to the mother speaker.

406: The mother speaker feeds back an addition success instruction to the user terminal, where the addition success instruction includes the identifier of the mother speaker and the identifier of the child speaker.

A format of the addition success instruction is shown in the following Table 12.

TABLE 12

| ID of a mother speaker | ID of a child speaker | Instruction type | Result |
|---|---|---|---|
| M001 | S01 | 3 | 1 |

ID of a mother speaker indicates an ID of a mother speaker to which a child speaker is to be added.

ID of a child speaker indicates an ID of a newly-added child speaker.

Instruction type indicates an operation type of an instruction. For example, a value 3 indicates adding a child speaker.

Result indicates an operation result. A value 1 indicates that addition succeeds, and a value 0 indicates that addition fails.

In step 406, the mother speaker may feed back the addition success instruction to the user terminal by using the cloud server, and the cloud server may add, after receiving the addition success instruction, a service vertical category table supported by the child speaker S02. For example, service types of all vertical categories of the child speaker S02 may be customized by default. After an APP of the user terminal receives the addition success instruction, of the child speaker, returned by the cloud server, UI (user interface) information of the newly-added child speaker S02 is added under a corresponding mother speaker, and setting of interaction between the child speaker and the mother speaker, permission of the child speaker, and a vertical category may be implemented in the foregoing manner.

In addition, before step 406, configuration synchronization with the mother speaker is further included. For example, the mother speaker sends configuration information to the child speaker S02, where the configuration information includes information about the identifier, initial volume, and alarm setting the child speaker.

For example, a format of the configuration information is shown in the following Table 13.

TABLE 13

| ID of a child speaker | Volume | Alarm time | Repeated data |
|---|---|---|---|
| S02 | 40 | 8:00 | [1, 2, 3, 4, 5] |

After the child speaker S02 receives the configuration information sent by the mother speaker, the child speaker S02 sets a configuration of the child speaker S02 based on the configuration information, for example, configure a volume to 40, configure an alarm time to 8:00, and configure an alarm to repeat from Monday to Friday every week. The child speaker S02 sends a first synchronization success message to the mother speaker responding to the configuration information. After the mother speaker receives a first synchronization success message sent by the child speaker S02 responding to the configuration information, the mother speaker sets the permission of the child speaker. For example, the child speaker S02 may be set to be available all time with reference to the format provided in Table 7. Because the configuration information sent by the mother speaker to the child speaker may be configuration information of the mother speaker, after the user terminal receives the addition success instruction, the child speaker and the mother speaker are configured synchronously by default.

Figure 8A:
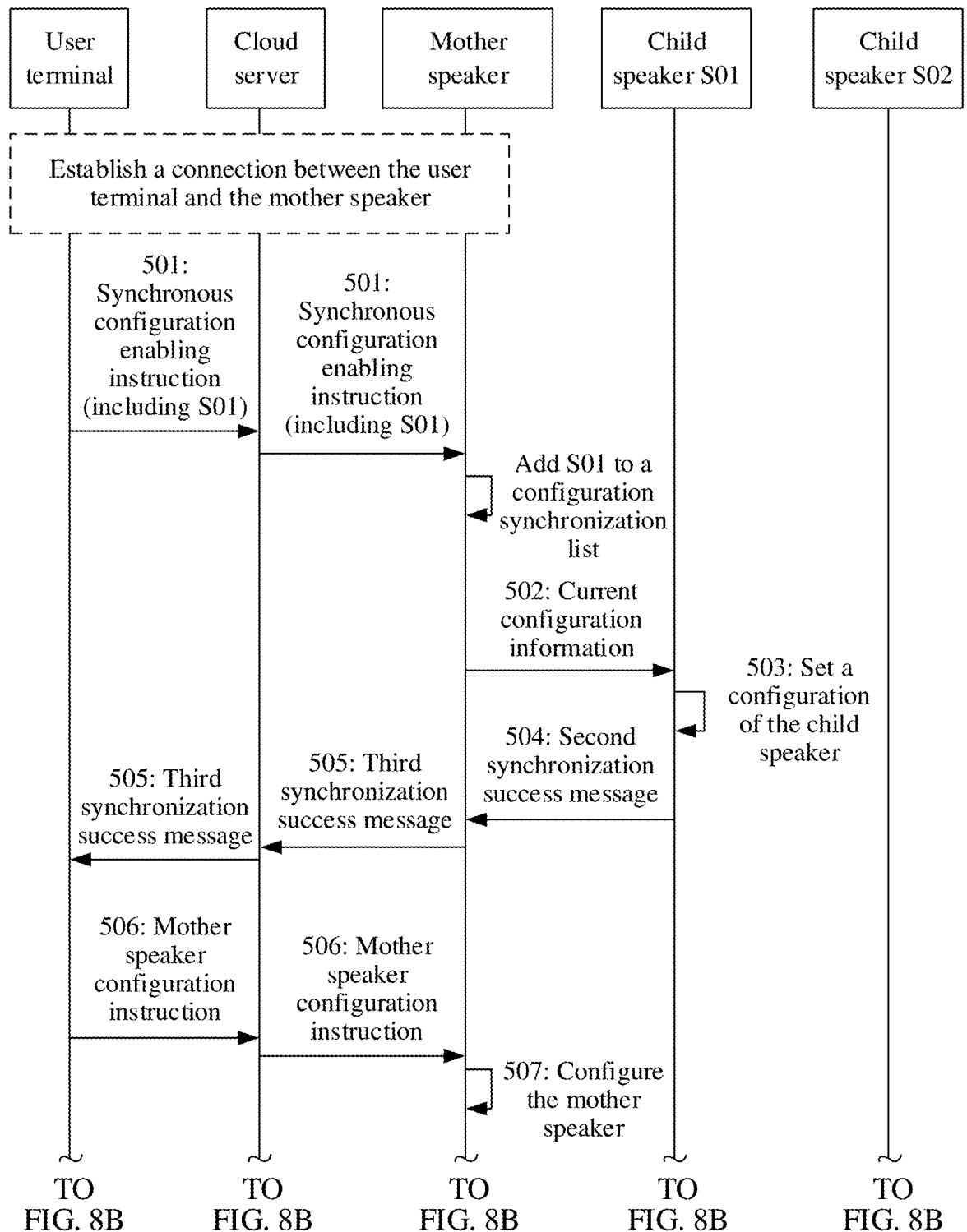
FIG. 8A is a schematic diagram of a speaker interaction method according to another embodiment.
Figure 8B:
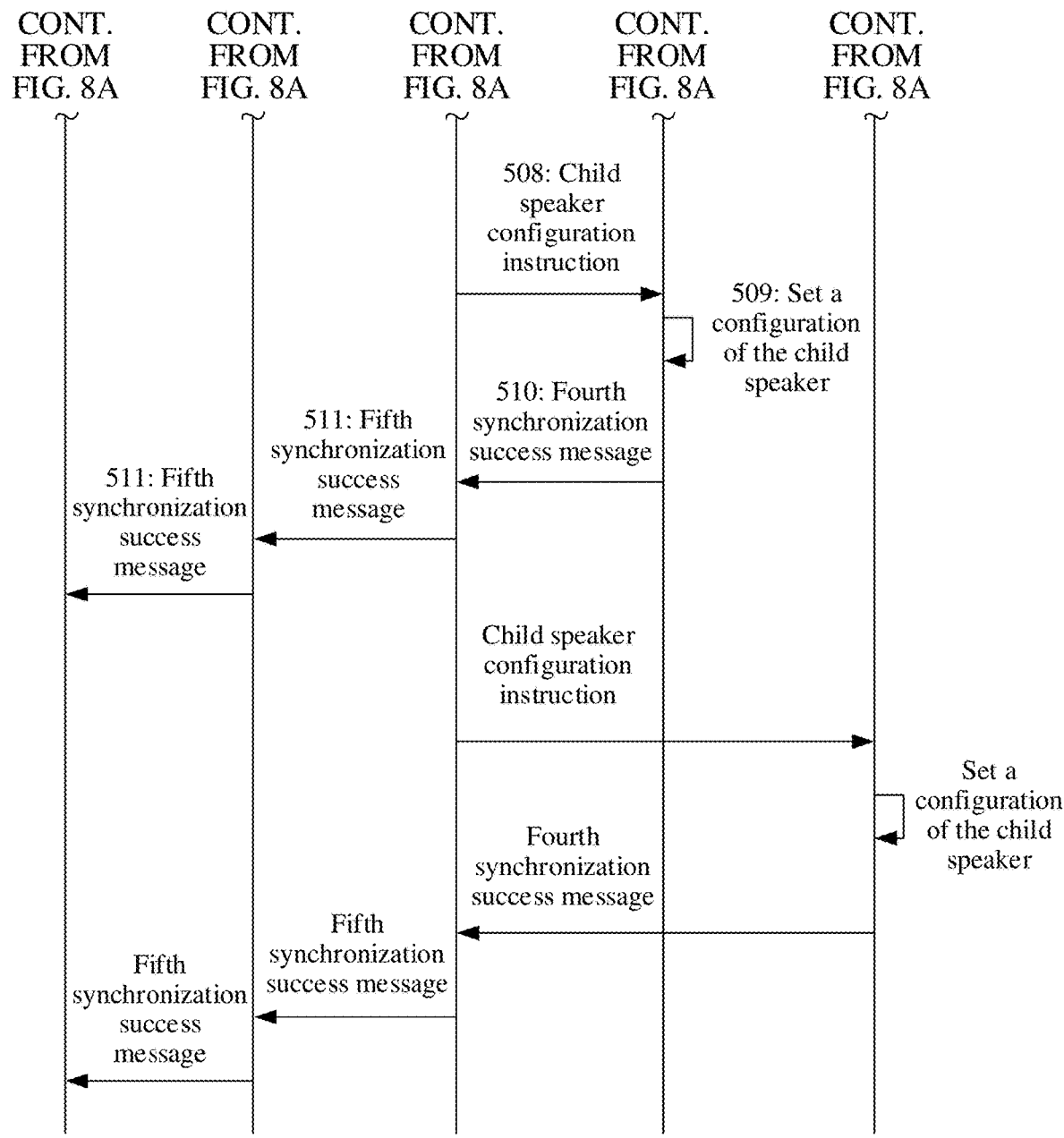
FIG. 8B is a schematic diagram of a speaker interaction method according to another embodiment.

In addition, the user can actively enable synchronization of a specific child speaker, so that all configurations of the child speaker are consistent with those of an associated mother speaker. In addition, when the configuration of the mother speaker is modified, the configuration of the child speaker is modified synchronously. For details, refer to FIG. 8A and FIG. 8B. The following steps are included.

501: A user terminal sends a synchronous configuration enabling instruction to a mother speaker, where the synchronous enabling instruction includes an identifier of the mother speaker and an identifier of a child speaker.

For example, a user may select a child speaker S01 by operating an APP on the user terminal, and generate the synchronization configuration enabling instruction, where a format of the synchronization configuration enabling instruction may be shown in the following Table 14.

TABLE 14

| ID of a mother speaker | ID of a child speaker | Instruction type | Instruction value |
|---|---|---|---|
| M001 | S01 | 4 | 1 |

ID of a mother speaker indicates an ID of a mother speaker of a synchronous child speaker is enabled.

ID of a child speaker indicates an ID of a synchronous child speaker is enabled.

Instruction type indicates an operation type of an instruction. For example, a value 4 indicates configuration synchronization between the child speaker and the mother speaker.

Instruction value indicates a value of an instruction. A value 1 indicates that synchronization is enabled, and a value 0 indicates that synchronization is disabled.

After receiving the synchronization configuration enabling instruction, the mother speaker adds the child speaker S01 to a configuration synchronization list, where the configuration synchronization list includes an identifier of a child speaker whose configuration is synchronized with the configuration of the mother speaker, for example, [S02, S01].

502: The mother speaker sends current configuration information of the mother speaker to the child speaker S01 according to the synchronous configuration enabling instruction, where the current configuration information includes the identifier of the child speaker and a value of at least one configuration item, and the at least one configuration item includes one or more of the following: volume setting and alarm setting.

503: The child speaker S01 sets a configuration of the child speaker S01 based on the current configuration information.

504: The child speaker S01 sends a second synchronization success message to the mother speaker responding to the current configuration information.

505: The mother speaker S01 sends a third synchronization success message to the user terminal based on the second synchronization success message.

In this way, after receiving the third synchronization success message, the user terminal may display, on the APP, information of synchronous configuration between the child speaker S01 and the mother speaker.

In addition, when the mother speaker enables configuration synchronization with the child speaker S02 according to the synchronization configuration enabling instruction, when the configuration of the mother speaker is modified, a configuration of the child speaker S02 is modified synchronously. The following steps are included.

506: The mother speaker obtains a mother speaker configuration instruction sent by the user terminal, where the mother speaker configuration instruction includes the identifier of the mother speaker and a value of at least one configuration item, and the at least one configuration item includes one or more of the following: volume setting and alarm setting.

For example, the user may set a volume of the mother speaker by operating an APP on the user terminal, and generate the mother speaker configuration instruction, where a format of the mother speaker configuration instruction may be shown in the following Table 15.

TABLE 15

| ID of a mother speaker | Instruction type | Volume (or another configuration item) |
|---|---|---|
| M001 | 5 | 40 |

ID of a mother speaker indicates an ID of a mother speaker of a synchronous child speaker is enabled.

Instruction type indicates an operation type of an instruction. For example, a value 5 indicates modifying a configuration of a mother speaker.

Volume indicates a volume value of the configuration.

507: The mother speaker configures the mother speaker according to the mother speaker configuration instruction.

508: The mother speaker generates a child speaker configuration instruction according to the mother speaker configuration instruction, and sends the child speaker configuration instruction to the child speaker, where the child speaker configuration instruction includes the identifier of the child speaker and a value of at least one configuration item, and the at least one configuration item includes one or more of the following: volume setting and alarm setting.

For example, the mother speaker queries the configuration synchronization list to determine that both the child speakers S01 and S02 enable functions of synchronizing the configuration of the mother speaker. In this case, a child speaker configuration instruction is generated for each child speaker, and a format of the child speaker configuration instruction may be shown in the following Table 16.

TABLE 16

| ID of a child speaker | Instruction type | Volume (or another configuration item) |
|---|---|---|
| S01 | 6 | 40 |
| S02 | 6 | 40 |

ID of a child speaker indicates an ID of a synchronous child speaker is enabled.

Instruction type indicates an operation type of an instruction. For example, a value 6 indicates modifying a configuration of a child speaker.

Volume indicates a volume value of the configuration.

509: The child speaker sets a configuration of the child speaker according to the child speaker configuration instruction.

510: The child speaker sends a fourth synchronization success message to the mother speaker responding to the child speaker configuration instruction.

511: The mother speaker sends a fifth synchronization success message to the user terminal based on the fourth synchronization success message.

An embodiment provides a speaker, where the speaker is applied to a mother speaker in a speaker system, and the speaker system includes one mother speaker and at least one child speaker. The mother speaker is configured to perform the speaker interaction method provided in the embodiments corresponding to FIG. 4 to FIG. 8A and FIG. 8B. The mother speaker provided in this embodiment may include modules corresponding to corresponding steps.

In this embodiment, functional modules of the mother speaker may be divided according to the speaker interaction method provided in the embodiments corresponding to FIG. 4 to FIG. 8A and FIG. 8B. For example, each functional module may be divided according to each function, or two or more functions may be integrated into one processing module. The integrated module may be implemented in a form of hardware or may be implemented in a form of a software functional module. In this embodiment, module division is an example, and is merely a logical function division. In actual implementation, another division manner may be used.

Figure 9:
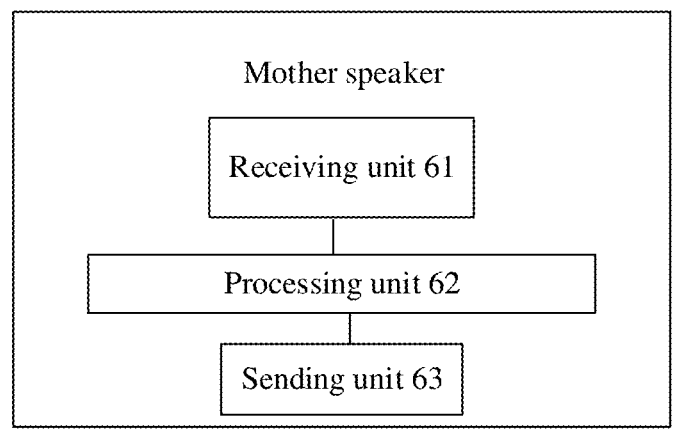
FIG. 9 is a schematic structural diagram of a mother speaker according to an embodiment.

In a case in which each function module is obtained through division based on each corresponding function, referring to FIG. 9, a manner of performing function module division on a mother speaker is provided, and the function module includes: a receiving unit 61, a processing unit 62, and a sending unit 63. Functions implemented by each unit module provided in this embodiment are as follows. The receiving unit 61 is configured to receive a first data packet sent by a child speaker, where the first data packet includes an identifier of the child speaker and voice data, and the voice data is data of a voice input by a user. The processing unit 62 is configured to parse the first data packet received by the receiving unit 61 to obtain the identifier of the child speaker. The sending unit 63 is configured to send a third data packet to a cloud server when the processing unit 62 determines, based on the identifier of the child speaker, that the child speaker meets permission, where the third data packet carries an identifier of the mother speaker, the identifier of the child speaker, and the voice data. The receiving unit 61 is configured to receive a fourth data packet sent by the cloud server, where the fourth data packet carries the identifier of the mother speaker, the identifier of the child speaker, and reply data responding to the voice data. The processing unit 62 is configured to parse the fourth data packet to obtain a second data packet. The sending unit 63 is further configured to send the second data packet obtained by the processing unit 62 to the child speaker, where the second data packet carries the identifier of the child speaker and the reply data responding to the voice data.

In an example solution, the receiving unit 61 is further configured to obtain a permission setting instruction sent by a user terminal, where the permission setting instruction is used to set the following permission of the child speaker: whether the child speaker is available. The processing unit 62 is further configured to set permission of the child speaker according to the permission setting instruction obtained by the receiving unit 61.

In an example solution, the permission further includes a period of time during which the child speaker is available, or a period of time during which the child speaker is unavailable.

In an example solution, the receiving unit 61 is further configured to obtain a child speaker addition instruction sent by a user terminal, where the child speaker addition instruction includes the identifier of the mother speaker. The sending unit 63 is further configured to send a multicast sniffing packet according to the child speaker addition instruction obtained by the receiving unit. The receiving unit 61 is further configured to receive a search result packet of the child speaker responding to the multicast sniffing packet. The processing unit 62 is configured to allocate the identifier of the child speaker to the child speaker based on the search result packet and establish a connection to the child speaker. The sending unit 63 is further configured to feed back a first addition success instruction to the user terminal, where the first addition success instruction includes the identifier of the mother speaker and the identifier of the child speaker.

In an example solution, the sending unit 63 is further configured to send configuration information to the child speaker, where the configuration information includes information about the identifier, initial volume, and alarm setting of the child speaker. The receiving unit 61 is further configured to receive a first synchronization success message sent by the child speaker responding to the configuration information.

In an example solution, the processing unit 62 is further configured to set permission of the child speaker.

In an example solution, the receiving unit 61 is configured to obtain a synchronous configuration enabling instruction sent by a user terminal, where the synchronous enabling instruction includes the identifier of the mother speaker and the identifier of the child speaker. The sending unit 63 is configured to send current configuration information of the mother speaker to the child speaker according to the synchronous configuration enabling instruction received by the receiving unit, where the current configuration information includes the identifier of the child speaker and a value of at least one configuration item, and the at least one configuration item includes one or more of the following: volume setting and alarm setting. The receiving unit 61 is configured to receive a second synchronization success message sent by the child speaker responding to the current configuration information. The sending unit 63 is configured to send a third synchronization success message to the user terminal based on the second synchronization success message received by the receiving unit.

In an example solution, the receiving unit 61 is further configured to obtain a mother speaker configuration instruction sent by the user terminal, where the mother speaker configuration instruction includes the identifier of the mother speaker and a value of at least one configuration item, and the at least one configuration item includes one or more of the following: volume setting and alarm setting. The processing unit is configured to configure the mother speaker according to the mother speaker configuration instruction. The processing unit 62 is further configured to generate a child speaker configuration instruction according to the mother speaker configuration instruction, where the child speaker configuration instruction includes the identifier of the child speaker and a value of at least one configuration item, and the at least one configuration item includes one or more of the following: volume setting and alarm setting. The sending unit 63 is further configured to send the child speaker configuration instruction to the child speaker. The receiving unit 61 is further configured to receive a fourth synchronization success message sent by the child speaker responding to the child speaker configuration instruction. The sending unit 63 is further configured to send a fifth synchronization success message to the user terminal based on the fourth synchronization success message received by the receiving unit 61.

Further, it may be appreciated that the mother speaker provided in this embodiment includes, but is not limited to, the foregoing modules. For example, the mother speaker may further include a storage unit. The storage unit may be configured to store program code of the mother speaker. All related content of the steps in the foregoing method embodiments may be cited in function descriptions of corresponding function modules. Details are not described herein again.

The processing unit 62 of the mother speaker may be the processor 201 in FIG. 2. The sending unit 63 and the receiving unit 61 may be the communications interface 203 in FIG. 2. When the mother speaker runs, the mother speaker performs the steps performed by the mother speaker in the embodiments corresponding to FIG. 4 to FIG. 8A and FIG. 8B.

An embodiment provides a speaker, where the speaker is applied to a child speaker in a speaker system, and the speaker system includes one mother speaker and at least one child speaker. The child speaker is configured to perform the speaker interaction method provided in the embodiments corresponding to FIG. 4 to FIG. 8A and FIG. 8B. The child speaker provided in this embodiment may include modules corresponding to corresponding steps.

In this embodiment, functional modules of the child speaker may be divided according to the speaker interaction method provided in the embodiments corresponding to FIG. 4 to FIG. 8A and FIG. 8B. For example, each functional module may be divided according to each function, or two or more functions may be integrated into one processing module. The integrated module may be implemented in a form of hardware or may be implemented in a form of a software functional module. In this embodiment, module division is an example, and is merely a logical function division. In actual implementation, another division manner may be used.

Figure 10:
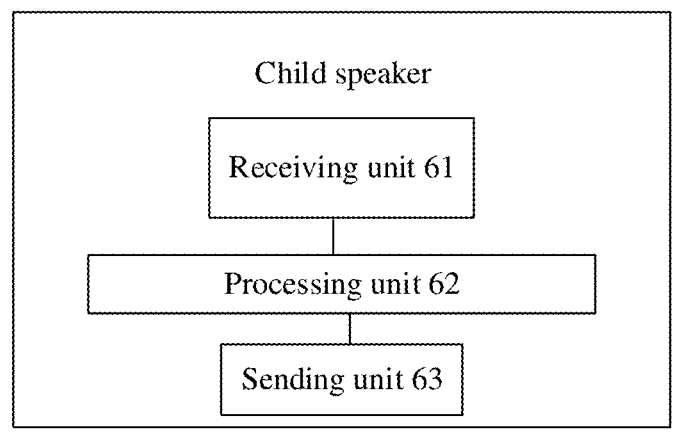
FIG. 10 is a schematic structural diagram of a child speaker according to an embodiment.

In a case in which each function module is obtained through division based on each corresponding function, referring to FIG. 10, a manner of performing function module division on a child speaker is provided, and the function module includes: a receiving unit 71, a processing unit 72, and a sending unit 73. Functions implemented by each unit module provided in this embodiment are as follows. The receiving unit 71 is configured to receive a voice input by a user. The processing unit 72 is configured to convert the voice received by the receiving unit into voice data. The sending unit 73 is configured to send a first data packet that carries the voice data and an identifier of the child speaker to the mother speaker. The receiving unit 71 is configured to receive a second data packet sent by the mother speaker, where the second data packet carries the identifier of the child speaker and reply data responding to the voice data.

In an example solution, the receiving unit 71 is further configured to obtain a wake-up instruction and enter a wake-up state according to the wake-up instruction. The sending unit 73 is further configured to play an alert tone to indicate the user that the child speaker enters the wake-up state.

In an example solution, the receiving unit 71 is further configured to receive a multicast sniffing packet sent by the mother speaker. The sending unit 73 is further configured to send a search result packet to the mother speaker responding to the multicast sniffing packet received by the receiving unit and establish a connection between the speaker and the mother speaker.

In an example solution, the receiving unit 71 is further configured to receive configuration information sent by the mother speaker, where the configuration information includes information about the identifier, initial volume, and alarm setting of the child speaker. The processing unit is further configured to set a configuration of the child speaker based on the configuration information. The sending unit 73 is further configured to send a first synchronization success message to the mother speaker responding to the configuration information received by the receiving unit.

In an example solution, the receiving unit 71 is further configured to receive current configuration information sent by the mother speaker, where the current configuration information includes the identifier of the child speaker and a value of at least one configuration item, and the at least one configuration item includes one or more of the following: volume setting and alarm setting. The processing unit 72 is further configured to set a configuration of the child speaker based on the current configuration information received by the receiving unit 71. The sending unit 73 is further configured to send a second synchronization success message to the mother speaker responding to the current configuration information received by the receiving unit 71.

In an example solution, the receiving unit 71 is further configured to receive a child speaker configuration instruction sent by the mother speaker, where the child speaker configuration instruction includes the identifier of the child speaker and a value of at least one configuration item, and the at least one configuration item includes one or more of the following: volume setting and alarm setting. The processing unit 72 is further configured to set a configuration of the child speaker according to the child speaker configuration instruction received by the receiving unit 71. The sending unit 73 is further configured to send a second synchronization success message to the mother speaker responding to the child speaker configuration instruction received by the receiving unit.

Further, it may be appreciated that the child speaker provided in this embodiment includes, but is not limited to, the foregoing modules. For example, the child speaker may further include a storage unit. The storage unit may be configured to store program code of the cloud speaker. All related content of the steps in the foregoing method embodiments may be cited in function descriptions of corresponding function modules. Details are not described herein again.

The processing unit 72 of the child speaker may be the processor 201 in FIG. 2. The sending unit 73 and the receiving unit 71 may be the communications interface 203 in FIG. 2. When the child speaker runs, the child speaker performs the steps performed by the child speaker in the embodiments corresponding to FIG. 4 to FIG. 8A and FIG. 8B.

An embodiment provides a cloud server, where cloud server is applied to a speaker system, and the speaker system includes one mother speaker and at least one child speaker. The cloud server is configured to perform the speaker interaction method provided in the embodiments corresponding to FIG. 4 to FIG. 8A and FIG. 8B. The cloud server provided in this embodiment may include modules corresponding to corresponding steps.

In this embodiment, functional modules of the cloud server may be divided according to the speaker interaction method provided in the embodiments corresponding to FIG. 4 to FIG. 8A and FIG. 8B. For example, each functional module may be divided according to each function, or two or more functions may be integrated into one processing module. The integrated module may be implemented in a form of hardware or may be implemented in a form of a software functional module. In this embodiment, module division is an example, and is merely a logical function division. In actual implementation, another division manner may be used.

Figure 11:
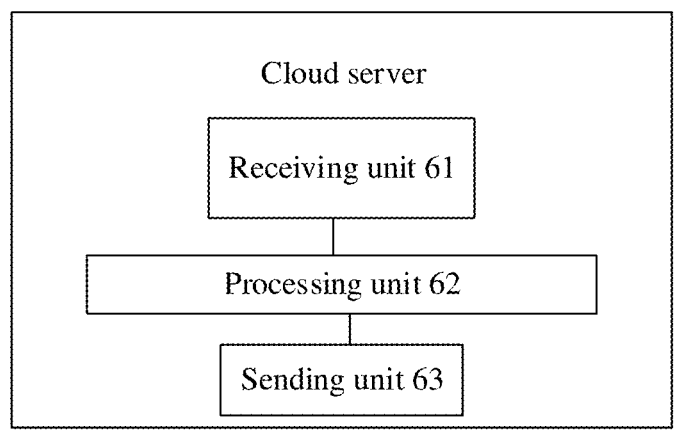
FIG. 11 is a schematic structural diagram of a cloud server according to another embodiment.

In a case in which each function module is obtained through division based on each corresponding function, referring to FIG. 11, a manner of performing function module division on a cloud server is provided, and the function module includes: a receiving unit 81, a processing unit 82, and a sending unit 83. Functions implemented by each unit module provided are as follows. The receiving unit 81 is configured to receive a third data packet sent by the mother speaker, where the third data packet carries an identifier of the mother speaker, an identifier of the child speaker, and the voice data. The processing unit 82 is configured to parse the third data packet to obtain reply data responding to the voice data. The sending unit 83 is configured to send a fourth data packet to the mother speaker, where the fourth data packet carries the identifier of the mother speaker, the identifier of the child speaker, and the reply data responding to the voice data.

In an example solution, the receiving unit 81 is configured to receive a service customization instruction sent by a user terminal, where the service customization instruction includes a correspondence between the identifier of the mother speaker, the identifier of the child speaker, and a customized service type, and the service type at least includes one or more of the following vertical categories: life, entertainment, news, education, tools, and children. The processing unit 82 is configured to obtain a service type of a request of the voice data and generate the reply data based on the service type.

In an example solution, the sending unit 83 is configured to feed back an addition success instruction sent by the mother speaker to the user terminal, where the addition success instruction includes the identifier of the mother speaker and the identifier of the child speaker. The processing unit is configured to set a default service type for the child speaker, and the service type at least includes one or more of the following vertical categories: life, entertainment, news, education, tools, and children. The processing unit 82 is configured to obtain a service type of a request of the voice data and generate the reply data based on the service type.

Further, it may be appreciated that the cloud server provided in this embodiment includes, but is not limited to, the foregoing modules. For example, the cloud server may further include a storage unit. The storage unit may be configured to store program code of the cloud server. All related content of the steps in the foregoing method embodiments may be cited in function descriptions of corresponding function modules. Details are not described herein again.

The processing unit 82 of the cloud server may be the processor 31 in FIG. 3. The sending unit 83 and the receiving unit 81 may be the communications interface 32 in FIG. 2. When the mother speaker runs, the cloud server performs the steps performed by the cloud server in the embodiments corresponding to FIG. 4 to FIG. 8A and FIG. 8B.

An embodiment further provides a computer-readable storage medium. The computer-readable storage medium stores an instruction. When the instruction is run on a speaker, the speaker is enabled to perform the foregoing speaker interaction method.

An embodiment further provides a computer-readable storage medium. The computer-readable storage medium stores an instruction. When the instruction is run on a cloud server, the cloud server is enabled to perform the foregoing speaker interaction method.

An embodiment further provides a computer program product including an instruction. When the instruction is run on a speaker, the speaker is enabled to perform the foregoing speaker interaction method.

An embodiment further provides a computer program product including an instruction. When the instruction is run on a cloud server, the cloud server is enabled to perform the foregoing speaker interaction method.

An embodiment further provides a chip system. The chip system includes a processor, configured to support a speaker in implementing the foregoing speaker interaction method. In a possible implementation, the chip system further includes a memory. The memory is configured to store a program instruction and data of the speaker. Additionally, the memory may alternatively not exist in the chip system. The chip system may include a chip or may include a chip and another discrete device. This is not limited in this embodiment.

An embodiment further provides a chip system. The chip system includes a processor, configured to support a cloud server in implementing the foregoing speaker interaction method. In a possible implementation, the chip system further includes a memory. The memory is configured to store a program instruction and data of the cloud server. Additionally, the memory may alternatively not exist in the chip system. The chip system may include a chip or may include a chip and another discrete device. This is not limited in this embodiment.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data terminal device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

The foregoing descriptions about implementations allow a person of ordinary skill in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided, it should be understood that the disclosed apparatus and method may be implemented in other manners. For example, the described apparatus embodiment is merely exemplary. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware or may be implemented in a form of a software functional unit.

When the integrated unit is implemented in the form of a software functional unit and sold or used as an independent product, the integrated unit may be stored in a readable storage medium. Based on such an understanding, the solutions of the embodiments essentially, or the part contributing to the prior art, or all or some of the solutions may be implemented in the form of a software product. The software product is stored in a storage medium and includes several instructions for instructing a device (which may be a single-chip microcomputer, a chip or the like) or a processor to perform all or some of the steps of the methods described in the embodiments. The foregoing storage medium includes: any medium that can store program code, such as a USB flash drive, a removable hard disk, a ROM), a), a magnetic disk, or an optical disc.

The foregoing descriptions are merely implementations of embodiments and are not intended as limiting. Any variation or replacement readily figured out by a person of ordinary skill in the art within the scope disclosed in the embodiments shall fall within the protection scope.

What is claimed is:

1. A speaker interaction method, applied to a speaker system, the speaker system comprising one mother speaker and at least one child speaker, and the method comprises:
    receiving, by the mother speaker, a first data packet sent by the child speaker, wherein the first data packet comprises an identifier of the child speaker and voice data, and the voice data is data of a voice input by a user;
    parsing, by the mother speaker, the first data packet to obtain the identifier of the child speaker;
    sending, by the mother speaker, a third data packet to a cloud server when determining, based on the identifier of the child speaker, that the child speaker meets permission, wherein the third data packet carries an identifier of the mother speaker, the identifier of the child speaker, and the voice data;
    receiving, by the mother speaker, a fourth data packet sent by the cloud server, wherein the fourth data packet carries the identifier of the mother speaker, the identifier of the child speaker, and reply data responding to the voice data; and
    parsing, by the mother speaker, the fourth data packet to obtain a second data packet, and sending the second data packet to the child speaker, wherein the second data packet carries the identifier of the child speaker and the reply data responding to the voice data.

2. The speaker interaction method according to claim 1, further comprising:
    obtaining, by the mother speaker, a permission setting instruction sent by a user terminal, wherein the permission setting instruction is used to set the following permission of the child speaker: whether the child speaker is available; and
    setting, by the mother speaker, permission of the child speaker according to the permission setting instruction.

3. The speaker interaction method according to claim 2, wherein the permission further comprises a period of time during which the child speaker is available, or a period of time during which the child speaker is unavailable.

4. The speaker interaction method according to claim 1, wherein before the receiving, by the mother speaker, of the first data packet sent by the child speaker, the method further comprises:
    obtaining, by the mother speaker, a child speaker addition instruction sent by a user terminal, wherein the child speaker addition instruction comprises the identifier of the mother speaker;
    sending, by the mother speaker, a multicast sniffing packet according to the child speaker addition instruction;
    receiving, by the mother speaker, a search result packet of the child speaker responding to the multicast sniffing packet;
    allocating, by the mother speaker, the identifier of the child speaker to the child speaker based on the search result packet, and establishing a connection to the child speaker; and
    feeding back, by the mother speaker, an addition success instruction to the user terminal, wherein the addition success instruction comprises the identifier of the mother speaker and the identifier of the child speaker.

5. The speaker interaction method according to claim 4, wherein before the feeding back, by the mother speaker, of the addition success instruction to the user terminal, the method further comprises:
    sending, by the mother speaker, configuration information to the child speaker, wherein the configuration information comprises information about the identifier, initial volume, and alarm setting of the child speaker; and
    receiving, by the mother speaker, a first synchronization success message sent by the child speaker responding to the configuration information.

6. The speaker interaction method according to claim 5, wherein the receiving, by the mother speaker, of the first synchronization success message sent by the child speaker responding to the configuration information further comprises:
  setting, by the mother speaker, permission of the child speaker.

7. The speaker interaction method according to claim 1, further comprising:
  obtaining, by the mother speaker, a synchronous configuration enabling instruction sent by a user terminal, wherein the synchronous enabling instruction comprises the identifier of the mother speaker and the identifier of the child speaker;
  sending, by the mother speaker, current configuration information of the mother speaker to the child speaker according to the synchronous configuration enabling instruction, wherein the current configuration information comprises the identifier of the child speaker and a value of at least one configuration item, and the at least one configuration item comprises one or more of the following: volume setting and alarm setting;
  receiving, by the mother speaker, a second synchronization success message sent by the child speaker responding to the current configuration information; and
  sending, by the mother speaker, a third synchronization success message to the user terminal based on the second synchronization success message.

8. The speaker interaction method according to claim 7, wherein after the sending, by the mother speaker, of the third synchronization success message to the user terminal based on the second synchronization success message, the method further comprises:
  obtaining, by the mother speaker, a mother speaker configuration instruction sent by the user terminal, wherein the mother speaker configuration instruction comprises the identifier of the mother speaker and a value of at least one configuration item, and the at least one configuration item comprises one or more of the following: volume setting and alarm setting;
  configuring, by the mother speaker, the mother speaker according to the mother speaker configuration instruction;
  generating, by the mother speaker, a child speaker configuration instruction according to the mother speaker configuration instruction, wherein the child speaker configuration instruction comprises the identifier of the child speaker and a value of at least one configuration item, and the at least one configuration item comprises one or more of the following: volume setting and alarm setting;
  sending, by the mother speaker, the child speaker configuration instruction to the child speaker;
  receiving, by the mother speaker, a fourth synchronization success message sent by the child speaker responding to the child speaker configuration instruction; and
  sending, by the mother speaker, a fifth synchronization success message to the user terminal based on the fourth synchronization success message.

9. A speaker, comprising:
  one or more processors;
  a memory;
  one or more programs;
  the one or more programs comprise an instruction, and when the instruction is executed by the speaker, the speaker performs the following operations:
  receiving a first data packet sent by the child speaker, wherein the first data packet comprises an identifier of the child speaker and voice data, and the voice data is data of a voice input by a user;
  parsing the first data packet to obtain the identifier of the child speaker;
  sending a third data packet to a cloud server when determining, based on the identifier of the child speaker, that the child speaker meets permission, wherein the third data packet carries an identifier of the mother speaker, the identifier of the child speaker, and the voice data;
  receiving a fourth data packet sent by the cloud server, wherein the fourth data packet carries the identifier of the mother speaker, the identifier of the child speaker, and reply data responding to the voice data; and
  parsing the fourth data packet to obtain a second data packet, and sending the second data packet to the child speaker, wherein the second data packet carries the identifier of the child speaker and the reply data responding to the voice data.

10. The speaker according to claim 9, wherein the operations further comprise:
  obtaining a permission setting instruction sent by a user terminal, wherein the permission setting instruction is used to set the following permission of the child speaker: whether the child speaker is available; and
  setting permission of the child speaker according to the permission setting instruction.

11. The speaker according to claim 10, wherein the permission further comprises a period of time during which the child speaker is available, or a period of time during which the child speaker is unavailable.

12. The speaker according to claim 9, wherein the operations further comprise:
  obtaining a child speaker addition instruction sent by a user terminal, wherein the child speaker addition instruction comprises the identifier of the mother speaker;
  sending a multicast sniffing packet according to the child speaker addition instruction;
  receiving a search result packet of the child speaker responding to the multicast sniffing packet;
  allocating the identifier of the child speaker to the child speaker based on the search result packet, and establishing a connection to the child speaker; and
  feeding back an addition success instruction to the user terminal, wherein the addition success instruction comprises the identifier of the mother speaker and the identifier of the child speaker.

13. The speaker according to claim 12, wherein the operations further comprise:
  sending configuration information to the child speaker, wherein the configuration information comprises information about the identifier, initial volume, and alarm setting of the child speaker; and
  receiving a first synchronization success message sent by the child speaker responding to the configuration information.

14. The speaker according to claim 13, wherein the receiving of the first synchronization success message sent by the child speaker responding to the configuration information further comprises:
  setting permission of the child speaker.

15. The speaker according to claim 9, wherein the operations further comprise:
  obtaining a synchronous configuration enabling instruction sent by a user terminal, wherein the synchronous enabling instruction comprises the identifier of the mother speaker and the identifier of the child speaker;

sending current configuration information of the mother speaker to the child speaker according to the synchronous configuration enabling instruction, wherein the current configuration information comprises the identifier of the child speaker and a value of at least one configuration item, and the at least one configuration item comprises one or more of the following: volume setting and alarm setting;

receiving a second synchronization success message sent by the child speaker responding to the current configuration information; and sending a third synchronization success message to the user terminal based on the second synchronization success message.

16. The speaker according to claim 15, wherein the operations further comprise:

obtaining, by the mother speaker, a mother speaker configuration instruction sent by the user terminal, wherein the mother speaker configuration instruction comprises the identifier of the mother speaker and a value of at least one configuration item, and the at least one configuration item comprises one or more of the following: volume setting and alarm setting;

configuring the mother speaker according to the mother speaker configuration instruction;

generating a child speaker configuration instruction according to the mother speaker configuration instruction, wherein the child speaker configuration instruction comprises the identifier of the child speaker and a value of at least one configuration item, and the at least one configuration item comprises one or more of the following: volume setting and alarm setting;

sending the child speaker configuration instruction to the child speaker;

receiving a fourth synchronization success message sent by the child speaker responding to the child speaker configuration instruction; and sending a fifth synchronization success message to the user terminal based on the fourth synchronization success message.

17. A non-transitory computer-readable storage medium comprising computer-executable instructions that, when executed by a processor, cause a speaker to:

receive a first data packet sent by the child speaker, wherein the first data packet comprises an identifier of the child speaker and voice data, and the voice data is data of a voice input by a user;

parse the first data packet to obtain the identifier of the child speaker;

send a third data packet to a cloud server when determining, based on the identifier of the child speaker, that the child speaker meets permission, wherein the third data packet carries an identifier of the mother speaker, the identifier of the child speaker, and the voice data;

receive a fourth data packet sent by the cloud server, wherein the fourth data packet carries the identifier of the mother speaker, the identifier of the child speaker, and reply data responding to the voice data; and parse the fourth data packet to obtain a second data packet and send the second data packet to the child speaker, wherein the second data packet carries the identifier of the child speaker and the reply data responding to the voice data.

18. The non-transitory computer-readable storage medium of claim 17, wherein the computer-executable instructions further cause the speaker to:

obtain a permission setting instruction sent by a user terminal, wherein the permission setting instruction is used to set the following permission of the child speaker: whether the child speaker is available; and set permission of the child speaker according to the permission setting instruction.

19. The non-transitory computer-readable storage medium of claim 17, wherein the computer-executable instructions further cause the speaker to:

obtain a child speaker addition instruction sent by a user terminal, wherein the child speaker addition instruction comprises the identifier of the mother speaker;

send a multicast sniffing packet according to the child speaker addition instruction;

receive a search result packet of the child speaker responding to the multicast sniffing packet;

allocate the identifier of the child speaker to the child speaker based on the search result packet, and establishing a connection to the child speaker; and feed back an addition success instruction to the user terminal, wherein the addition success instruction comprises the identifier of the mother speaker and the identifier of the child speaker.

20. The non-transitory computer-readable storage medium of claim 19, wherein the computer-executable instructions further cause the speaker to:

send configuration information to the child speaker, wherein the configuration information comprises information about the identifier, initial volume, and alarm setting of the child speaker; and receive a first synchronization success message sent by the child speaker responding to the configuration information.

* * * * *